United States Patent
Hirokubo et al.

(10) Patent No.: US 9,170,157 B2
(45) Date of Patent: Oct. 27, 2015

(54) TUNABLE INTERFERENCE FILTER, OPTICAL MODULE, PHOTOMETRIC ANALYZER, AND MANUFACTURING METHOD OF TUNABLE INTERFERENCE FILTER

(75) Inventors: Nozomu Hirokubo, Fujimi (JP); Akira Sano, Shiojiri (JP)

(73) Assignee: Seiko Epson Corporation (JP)

(*) Notice: Subject to any disclaimer, the term of this patent is extended or adjusted under 35 U.S.C. 154(b) by 224 days.

(21) Appl. No.: 13/236,053

(22) Filed: Sep. 19, 2011

(65) Prior Publication Data

US 2012/0086945 A1    Apr. 12, 2012

(30) Foreign Application Priority Data

Oct. 7, 2010   (JP) .................................. 2010-227242

(51) Int. Cl.
| | |
|---|---|
| G01J 3/51 | (2006.01) |
| G01J 3/26 | (2006.01) |
| G02B 26/00 | (2006.01) |
| G02B 5/28 | (2006.01) |

(52) U.S. Cl.
CPC .... G01J 3/51 (2013.01); G01J 3/26 (2013.01); G02B 5/28 (2013.01); G02B 5/284 (2013.01); G02B 26/001 (2013.01); G02B 26/002 (2013.01)

(58) Field of Classification Search
CPC ........ G02B 2/28; G02B 2/284; G02B 26/001; G02B 6/29358; G01J 3/26
USPC .................. 359/260, 577–590; 356/450–521; 156/99–109
See application file for complete search history.

(56) References Cited

U.S. PATENT DOCUMENTS

| | | |
|---|---|---|
| 7,304,800 B2 | 12/2007 | Nakamura et al. |
| 2005/0122191 A1* | 6/2005 | Nakamura et al. ............ 333/202 |
| 2008/0239494 A1* | 10/2008 | Zander ......................... 359/578 |
| 2010/0142067 A1 | 6/2010 | Hanamura et al. |
| 2010/0226029 A1* | 9/2010 | Funasaka ..................... 359/850 |
| 2011/0194118 A1 | 8/2011 | Hirokubo et al. |
| 2011/0228396 A1 | 9/2011 | Shinto et al. |
| 2012/0120402 A1* | 5/2012 | Hirokubo et al. ............. 356/450 |

FOREIGN PATENT DOCUMENTS

| | | |
|---|---|---|
| JP | 09-079980 | 3/1997 |
| JP | 2005-165067 | 6/2005 |
| JP | 2010-008644 A | 1/2010 |
| JP | 2010-139552 | 6/2010 |
| JP | 2011-164374 | 8/2011 |

* cited by examiner

*Primary Examiner* — Jennifer L Doak
*Assistant Examiner* — Kimberly N Kakalec
(74) *Attorney, Agent, or Firm* — Harness, Dickey & Pierce, P.L.C.

(57) ABSTRACT

A tunable interference filter comprising a first substrate, a second substrate facing the first substrate, a first reflection film formed on the first substrate, a second reflection film formed on the second substrate, the second reflection film facing the first reflection film by interposing a gap, and a gap adjustable-part that adjusts the gap, wherein the second substrate has a first surface and a second surface opposed to the first surface, wherein the second substrate includes a first groove on the first surface, and wherein the second substrate includes a second groove on the second surface, the second groove facing the first groove.

19 Claims, 12 Drawing Sheets

TUNABLE INTERFERENCE FILTER, OPTICAL MODULE, PHOTOMETRIC ANALYZER, AND MANUFACTURING METHOD OF TUNABLE INTERFERENCE FILTER

BACKGROUND

1. Technical Field

The present invention relates to a tunable interference filter that selects and outputs light having a desired target wavelength from incident light, an optical module including the tunable interference filter, a photometric analyzer including the optical module, and a manufacturing method of the tunable interference filter.

2. Related Art

In related art, a light filter (tunable interference filter) in which reflection films are oppositely provided on surfaces opposed to each other of a pair of substrates is known (for example, see Patent Document 1 (JP-A-2010-139552)). In the tunable interference filter, lights are reflected between the pair of reflection films, only the light having a specific wavelength is transmitted, lights having other wavelengths are cancelled out by interferences, and thereby, the light having the specific wavelength is transmitted from incident lights.

In the tunable interference filter in Patent Document 1, the first substrate and the second substrate are oppositely provided. Further, on the surface of the first substrate that does not face the second substrate, an annular groove part is formed, and, by the formation of the groove part, a cylindrical movable part is formed in a substrate center part and a diaphragm formed coaxially with the movable part in an annular shape is formed. Further, a pair of electrodes are oppositely provided between the pair of substrates, and mirrors are oppositely provided on the surface of the movable part facing the second substrate and the second substrate. Here, by applying a voltage to the pair of electrodes, the diaphragm is curved due to electrostatic attractive force, the movable part with the mirror formed thereon moves in the substrate thickness direction, and thus, the gap between the pair of mirrors may be adjusted. Thereby, the tunable interference filter can transmit only light having a specific wavelength in response to the gap.

In the above described tunable interference filter of Patent Document 1, the diaphragm is required to be curved, and it is necessary to form the thickness dimension of the bottom surface of the groove part, i.e., the thickness dimension of the diaphragm by etching the groove part to a desired depth.

For example, in the case where the groove part is etched to the desired depth by isotropic etching, the inner side surface of the groove part is largely etched (side etching is larger), the opening edge of the groove part becomes wider, and the region of a bonded part for bonding the substrates and the region of the movable part respectively become narrower. Accordingly, in order to secure the region of the bonded part and the region of the movable part, it is necessary to use larger substrates in advance, and upsizing of the substrates is problematic.

Further, in the above described tunable interference filter of Patent Document 1, the groove part is formed only on one surface of the first substrate, and thus, the longer etching time for etching to the desired depth is problematic.

SUMMARY

An advantage of some aspects of the invention is to provide a tunable interference filter for which substrates can be downsized and etching time can be shortened, an optical module, a photometric analyzer, and a manufacturing method of the tunable interference filter.

A tunable interference filter according to one aspect of the invention includes a first substrate, a second substrate on which a movable part having a movable surface opposed to the first substrate and a connection holding part that movably holds the movable part in a thickness direction of the first substrate are provided, a first reflection film provided on a surface of the first substrate facing the second substrate, a second reflection film provided on the movable surface of the second substrate and opposed to the first reflection film via a predetermined gap, and a gap-adjustable part that can adjust the gap between the reflection films, wherein a first groove part is formed by isotropic wet-etching on a first surface of the second substrate facing the first substrate, a second groove part is formed by isotropic wet-etching on a second surface of the second substrate opposite to the first substrate, and the connection holding part is formed by a region where a first bottom surface in parallel to the movable surface in the first groove part and a second bottom surface in parallel to the movable surface in the second groove part overlap in a plan view in which the second substrate is seen in a thickness direction.

According to the aspect of the invention, the first groove part and the second groove part are formed by isotropic wet-etching on the first surface and the second surface of the second substrate, and the connection holding part is formed by the region where the bottom surfaces of the respective groove parts overlap in the plan view. According thereto, in comparison to the depth dimension of the groove part formed only on one surface of the above described substrate in related art, the depth dimensions of the respective groove parts may be made smaller, and the connection holding part having the desired thickness dimension may be formed. Since the depth dimensions of the respective groove parts may be made smaller than that in related art, the side etching of the inner side surfaces of the groove parts may be made smaller, and spread of the opening edges of the groove parts may be suppressed. Therefore, since the regions of the bonded parts for bonding of the substrates and the movable part may be secured larger without using larger substrates in advance, the respective substrates may be downsized.

To make the above described side etching smaller, for example, use of anisotropic etching may be considered. However, typically, amorphous glass is used for the substrate, and anisotropic etching may not be performed. Accordingly, to perform anisotropic etching, it is necessary to prepare substrate obtained by anisotropically pre-processing amorphous glass in advance, and the cost becomes higher. Further, to perform anisotropic etching, it is necessary to use reactive ion etching (RIE) equipment or the like, and the cost becomes higher. Accordingly, the cost is reduced using isotropic etching in the aspects of the invention.

Further, if the respective groove parts are formed on both sides of the substrate using anisotropic etching, it is necessary to perform etching with respect to each surface and it is impossible to etch both sides at the same time, and the same time as the etching time when only one side is etched for forming the groove part is necessary.

Accordingly, in the aspect of the invention, since the respective groove parts are formed on both sides of the second substrate by isotropic wet-etching, if the second substrate is dipped in an etchant, the groove parts may be respectively formed at the same time on both sides of the second substrates. That is, in comparison to the etching time when the diaphragm having the desired thickness dimension is formed by forming the groove part only on one surface of the above described substrate in related art, the etching time for forming the connection holding part having the desired thickness dimension may be shortened.

In the tunable interference filter according to the aspect of the invention, it is preferable that areas of the first bottom surface and the second bottom surface are formed to be equal.

According to the aspect of the invention, since the areas of the bottom surfaces of the respective groove parts are formed to be equal, for example, when the depth dimensions of the respective grooves are equal, the opening edges of the respective groove parts overlap in the plan view, and the regions of the first surface side (bonded surface) and the second surface side of the bonded part may be made equal. Thereby, at the bonding step, when the second surface side of the bonded part is pressed, pressing force may be applied to the entire bonded surface and the workability of the bonding work of the substrates may be improved.

On the other hand, in the case where the depth dimensions are different, in comparison to the case where the depth dimensions are made equal, the side etching of the groove part having the shallower depth dimension may be made smaller. Thereby, the regions of the bonded surface and the movable surface may be secured.

In the tunable interference filter according to the aspect of the invention, it is preferable that an area of the second bottom surface is formed larger than an area of the first bottom surface, and, in the plan view, the first bottom surface is located within a region of the second bottom surface.

Here, the sizes of the areas of the bottom surfaces of the respective groove parts are defined by the regions of the resists patterned on the first surface and the second surface of the second substrate when the groove parts are formed. Further, to make the sizes of the bottom surfaces of the respective groove parts equal, it is necessary to make the regions of the resists patterned on the first surface and the second surface of the second substrate equal, however, it is difficult to perform equally and accurately patterning, and an error of about 5 µm typically occurs on each surface.

On this account, if the area of the first bottom surface of the first groove part is determined in advance and the region to be patterned on the second surface (formation pattern for forming the bottom surface of the groove part) is positively made larger than the region to be patterned on the first surface, it is not necessary to consider the above described error. Further, if the first groove part and the second groove part are formed by isotropic etching, the area of the second bottom surface of the second groove part may be formed larger than the area of the first bottom surface of the first groove part. Thereby, the first bottom surface of the first groove part may be secured in a desired area without consideration of the above described error.

In the tunable interference filter according to the aspect of the invention, it is preferable that depth dimensions of the first groove part and the second groove part are formed to be equal dimensions.

Here, the etching time when the groove parts having the different depth dimensions are formed is determined to be the etching time when the groove part having the larger depth dimension is formed. However, according to the aspect of the invention, since the depth dimensions of the respective groove parts are formed to be equal dimensions, the etching time may be made shorter than the etching time when groove parts having the different depth dimensions are formed.

Further, in comparison to the etching time when the groove part is formed only on one surface of the above described substrate in related art, in the aspect of the invention, the depth dimensions of the respective groove parts are formed to be equal dimensions, and the etching time for forming the connection holding part having the desired thickness dimension may be shortened to half.

In the tunable interference filter according to the aspect of the invention, it is preferable that a depth dimension of the first groove part is formed smaller than a depth dimension of the second groove part.

According to the aspect of the invention, in the case where the area of the second bottom surface of the second groove part is larger than the area of the first bottom surface of the first groove part, the depth dimension of the first groove part is formed smaller than the depth dimension of the second groove part. According thereto, for example, in comparison to the case where the areas of the bottom surfaces of the respective groove parts are equal and the depth dimensions of the respective groove parts are made to be equal dimensions or the case where the depth dimension of the first groove part is formed larger than the depth dimension of the second groove part, the side etching of the first groove part of the aspect of the invention may be made even smaller. Therefore, the opening area of the first groove part may be made smaller and the regions of the bonded surface and the movable surface in the first surface of the second substrate may be secured even larger.

In the tunable interference filter according to the aspect of the invention, it is preferable that a depth dimension of the first groove part is formed larger than a depth dimension of the second groove part, and, in the plan view, opening edges of the first groove part and the second groove part overlap.

According to the aspect of the invention, in the case where the area of the second bottom surface of the second groove part is larger than the area of the first bottom surface of the first groove part, the depth dimension of the first groove part is formed larger than the depth dimension of the second groove part and the opening edges of the respective groove parts overlap in the plan view. According thereto, in comparison to the case where the depth dimensions of the respective groove parts are made to be equal dimensions, the depth dimension of the second groove part becomes smaller and the side etching of the second groove part may be made even smaller, and the opening area of the second groove part may be made even smaller and the region of the surface opposite to the bonded surface may be secured larger.

Further, in the plan view, the opening edge of the first groove part overlaps with the opening edge of the second groove part, and thus, even when the depth dimension of the first groove part is formed larger than the depth dimension of the second groove part, the side etching of the first groove part is not larger than the side etching of the second groove part and the regions of the bonded surface and the movable surface may be sufficiently secured. Furthermore, the areas of the region of the bonded surface and the region at the opposite side to the bonded surface may be made equal, and, at the bonding step, when the surface at the opposite side to the bonded surface in the bonded part is pressed, pressing force maybe applied to the entire bonded surface and the workability of the bonding work of the substrates may be improved.

An optical module according to one aspect of the invention includes the above described tunable interference filter, and a light receiving unit that receives test object light transmitted through the tunable interference filter.

According to the aspect of the invention, as is the above described aspects of the invention, the substrates may be downsized and the tunable interference filter may be downsized. Therefore, a downsized optical module may be realized.

A photometric analyzer according to one aspect of the invention includes the above described optical module, and an analytical processing unit that analyzes light properties of the test object light based on the light received by the light receiving unit of the optical module.

According to the aspect of the invention, since the optical module having the above described tunable interference filter is provided, a downsized photometric analyzer may be realized.

A manufacturing method of a tunable interference filter according to one aspect of the invention is a manufacturing method of the above described tunable interference filter including a first substrate manufacturing step of forming the first substrate and forming the first reflection film and the gap-adjustable part on the first substrate, a second substrate manufacturing step of forming the second substrate and forming the second reflection film and the gap-adjustable part on the second substrate, and a bonding step of bonding the first substrate and the second substrate in positions in which the respective reflection films are opposed, wherein the second substrate manufacturing step has a resist application step of applying a resist on an entire surface of the second substrate, a light exposure and development step of exposing the resist to light and developing the resist, and patterning a location where the connection holding part is formed, a groove part formation step of forming the recessed first groove part and second groove part on the first surface and the second surface by isotropic wet-etching, and a resist removable step of removing the resist.

According to the aspect of the invention, since the first substrate manufacturing step, the second substrate manufacturing step, and the bonding step are provided, the above described tunable interference filter may be manufactured. Note that, at the second substrate manufacturing step, the second reflection film and the gap-adjustable part are formed after the resist removal step.

Then, at the second substrate manufacturing step, after the location where the connection holding part is formed is patterned, the recessed first groove part and second groove part are formed at the same time on the first surface and the second surface by isotropic wet-etching. According thereto, in comparison to the above described case where the groove part is formed only on one side in related art, the depth dimensions of the respective groove parts may be made smaller, the side etching of the inner side surfaces of the groove parts may be made smaller, and the opening areas of the groove parts may be made smaller. Therefore, the substrates may be downsized while the regions of the bonded parts for bonding the substrates and the movable part are secured larger without using larger substrates in advance.

Further, since the respective groove parts are formed at the same time on both sides of the second substrates by isotropic etching and the connection holding part having the desired thickness dimension is formed, in comparison to the etching time when the diaphragm having the desired thickness dimension is formed by forming the groove part by etching only on one surface of the above described substrate in related art, the etching time may be shortened.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

As below, the first embodiment according to the invention will be explained with reference to the drawings.

1. Overall Configuration of Colorimetric Instrument

Figure 1:
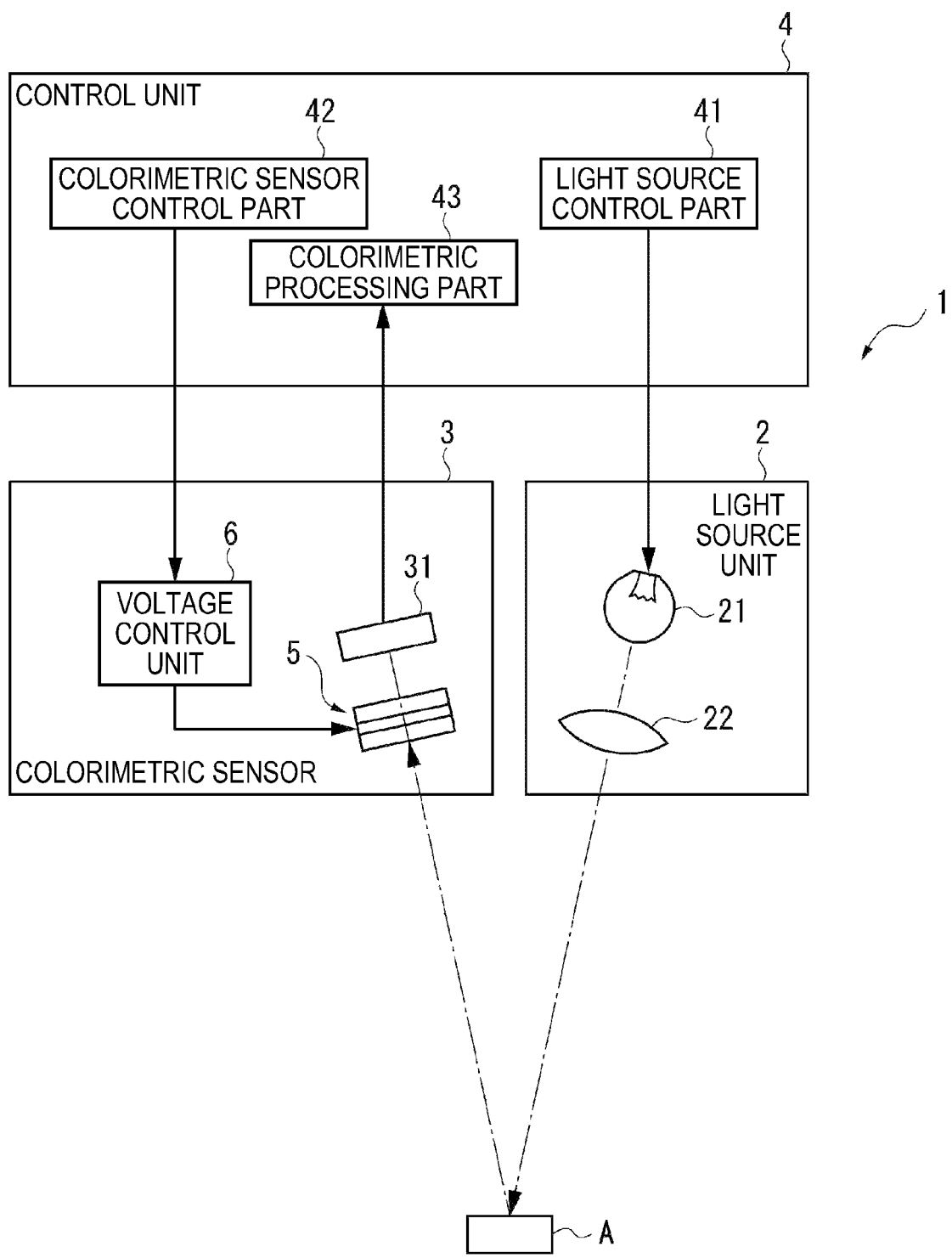
FIG. 1 shows a schematic configuration of a colorimetric module of a first embodiment according to the invention.

FIG. 1 shows a schematic configuration of a colorimetric instrument 1 (photometric analyzer) including a tunable interference filter of the first embodiment according to the invention.

As shown in FIG. 1, the colorimetric instrument 1 includes a light source unit 2 that outputs light to a test object A, a colorimetric sensor 3 (optical module), and a control unit 4 that controls the entire operation of the colorimetric instrument 1. Further, the colorimetric instrument 1 is a module that reflects light output from the light source unit 2 on the test object A, receives the reflected test object light in the colorimetric sensor 3, and analyzes and measures the chromaticity of the test object light, i.e., the color of the test object A based on the detection signal output from the colorimetric sensor 3.

2. Configuration of Light Source Unit

The light source unit 2 includes a light source 21 and plural lenses 22 (only one is shown in FIG. 1), and outputs white light to the test object A. Further, the plural lenses 22 may include a collimator lens, and the light source unit 2 brings the white light output from the light source 21 into parallel light by the collimator lens and outputs it from a projection lens (not shown) toward the test object A. Note that, in the embodiment, the colorimetric instrument 1 including the light source unit 2 is taken as an example, however, for example, in the case where the test object A is a light emitting member such as a liquid crystal panel, the light source unit 2 may not be provided.

3. Configuration of Colorimetric Sensor

The colorimetric sensor 3 includes an etalon 5 (tunable interference filter), a light receiving device 31 (light receiving unit) that receives light transmitted through the etalon 5, and a voltage control unit 6 that varies a wavelength of the light transmitted through the etalon 5 as shown in FIG. 1. Further, the colorimetric sensor 3 includes an incidence optical lens (not shown) that guides the reflected light (test object light)

reflected on the test object A inward in a position facing the etalon 5. Further, the colorimetric sensor 3 spectroscopically separates only the light having a predetermined wavelength of the test object lights entering from the incidence optical lens, and receives the spectroscopically separated light by the light receiving device 31.

The light receiving device 31 includes a photoelectric conversion element and generates electric signals in response to amounts of received light. Further, the light receiving device 31 is connected to the control unit 4, and outputs the generated electric signals as light reception signals to the control unit 4.

3-1. Configuration of Etalon

Figure 2:
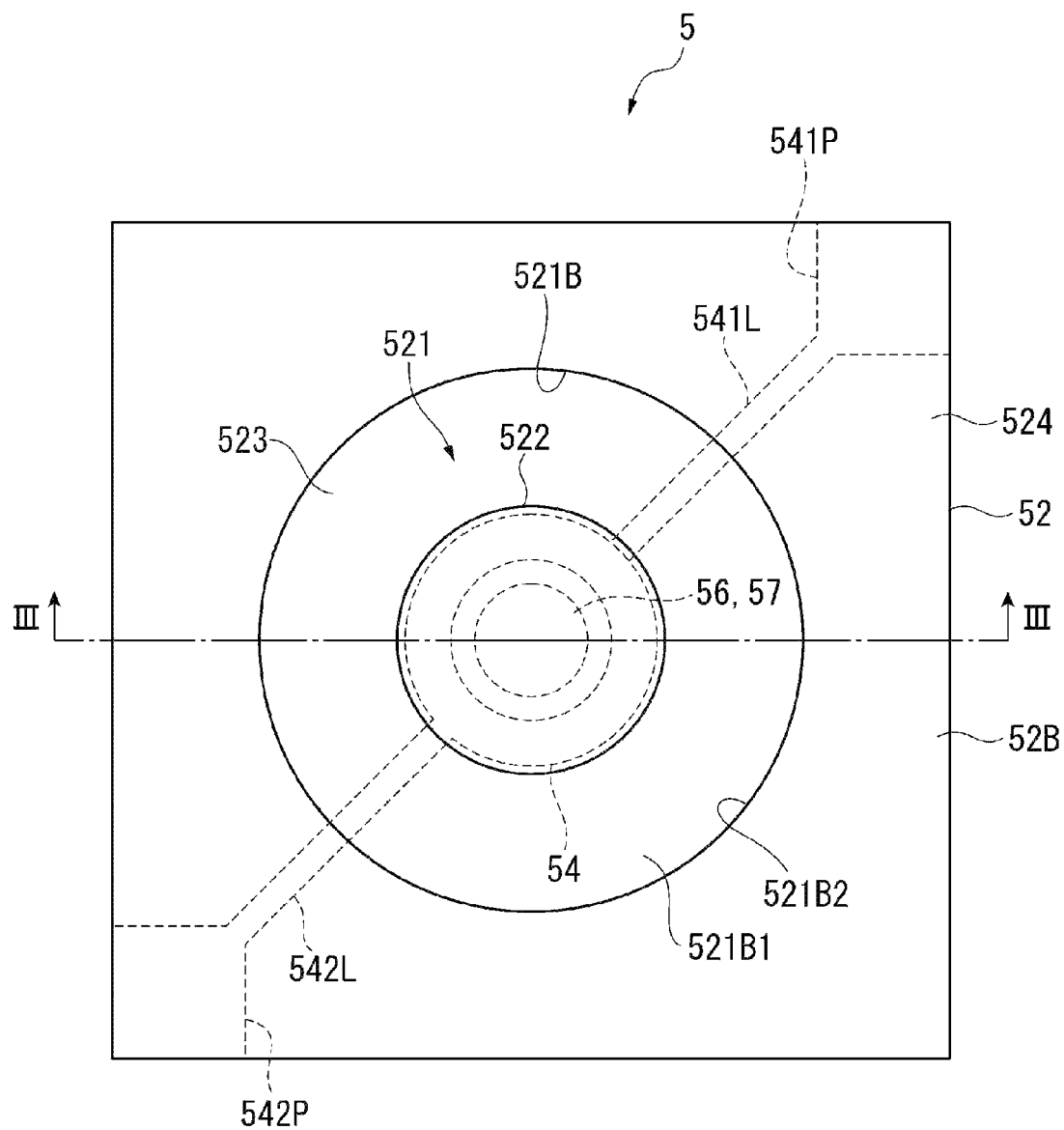
FIG. 2 is a plan view showing a schematic configuration of an etalon of the first embodiment.
Figure 3:
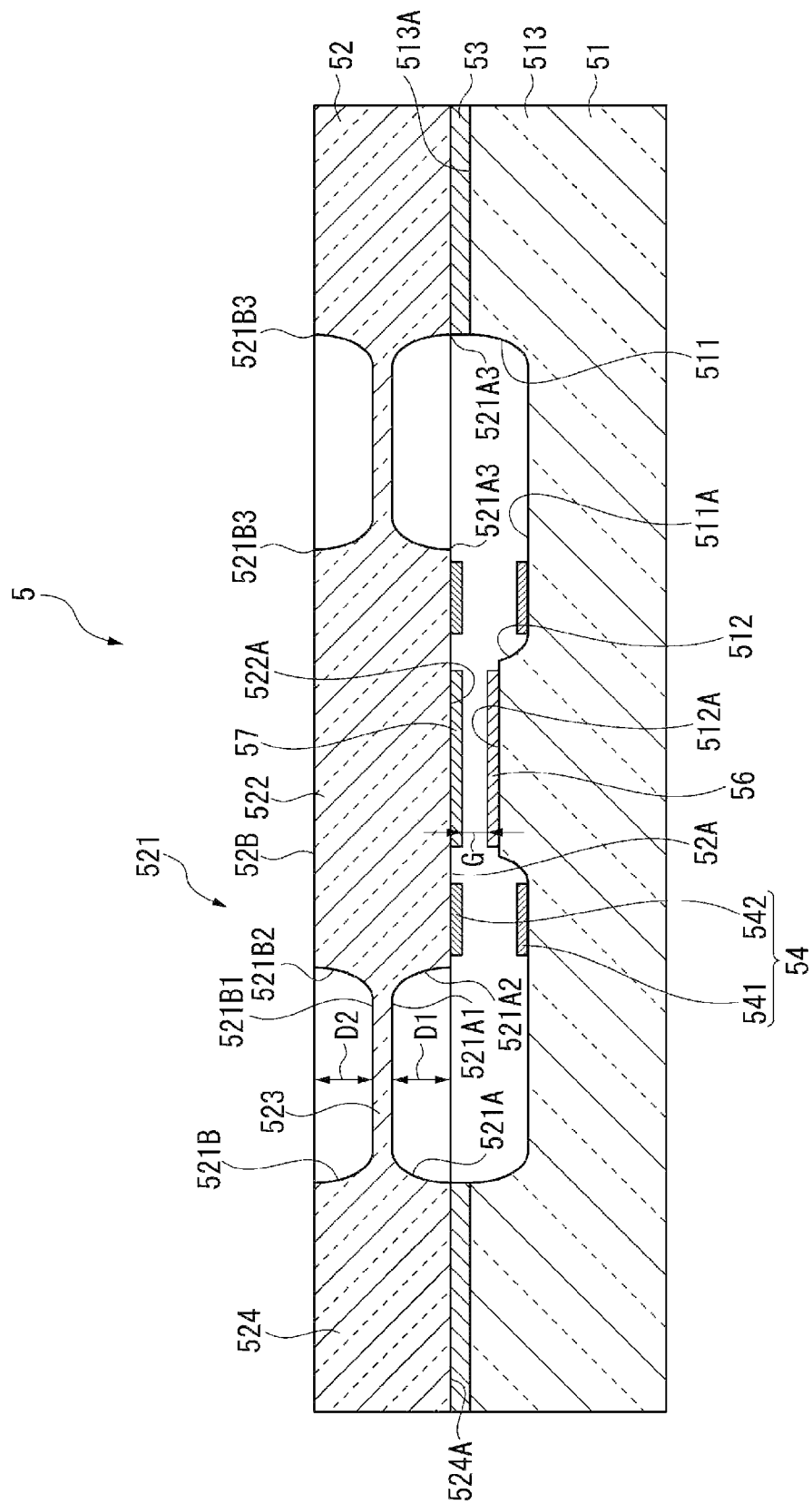
FIG. 3 is a sectional view showing a schematic configuration of the etalon of the first embodiment.

FIG. 2 is a plan view showing a schematic configuration of the etalon 5, and FIG. 3 is a sectional view showing a schematic configuration of the etalon 5. While the test object light enters the etalon 5 from the lower side of the drawing in FIG. 1, the test object light enters from the upper side of the drawing in FIG. 3.

The etalon 5 is a plate-like optical member having a square shape in the plan view as shown in FIG. 2, and one side is formed in 10 mm, for example. The etalon 5 includes a first substrate 51 and a second substrate 52 as shown in FIG. 3, and formed by bonding the substrates 51, 52 to each other via a bonding layer 53. These two substrates 51, 52 are respectively formed using various kinds of glass such as soda glass, crystalline glass, quartz glass, lead glass, potassium glass, borosilicate glass, or alkali-free glass, quartz, or the like. Furthermore, the two substrates 51, 52 are integrally formed by bonding of bonded parts 513, 524 formed near the outer circumferential part, which will be described later, using cold activated bonding, siloxane bonding using a plasma-polymerized film, or the like, for example.

Further, a fixed mirror 56 (first reflection film) and a movable mirror 57 (second reflection film) are provided between the first substrate 51 and the second substrate 52. Here, the fixed mirror 56 is fixed to the surface of the first substrate 51 facing the second substrate 52 (a mirror fixing surface 512A, which will be described later), and the movable mirror 57 is fixed to the surface of the second substrate 52 facing the first substrate 51 (a movable surface 522A, which will be described later). Furthermore, the fixed mirror 56 and the movable mirror 57 are oppositely provided via a gap between mirrors G.

In addition, an electrostatic actuator 54 for adjustment of the dimension of the gap between mirrors G between the fixed mirror 56 and the movable mirror 57 is provided between the first substrate 51 and the second substrate 52.

3-1-1. Configuration of First Substrate

The first substrate 51 is formed by processing a quartz glass base material ($SiO_2$: silicon dioxide) having a thickness of 500 μm, for example, by etching. Specifically, as shown in FIG. 3, an electrode formation groove 511, a mirror fixing part 512, and the bonded part 513 are formed on the first substrate 51 by isotropic wet-etching using HF (hydrogen fluoride) or the like.

The electrode formation groove 511 is formed in a circular shape around a planar center point in a plan view of the etalon 5 seen from a thickness direction as shown in FIG. 2 (hereinafter, referred to as "etalon plan view").

The mirror fixing part 512 is formed to project from the center position of the electrode formation groove 511 toward the second substrate 52 side in the etalon plan view.

In the electrode formation groove 511, a ring-shaped electrode fixing surface 511A is formed between the outer circumferential edge of the mirror fixing part 512 and the inner circumferential wall of the electrode formation groove 511, and a first electrode 541 is formed at the mirror fixing part 512 side of the electrode fixing surface 511A. The first electrode 541 has conductivity, and not particularly limited as long as it can generate electrostatic attractive force between the first electrode 541 and the second electrode 542 by application of a voltage between the second electrode 542 of the second substrate 52, which will be described later. In the embodiment, ITO (Indium Tin Oxide) that can be used as a film for bonding is used. Alternatively, a metal layered product of Au/Cr or the like may be used.

On the upper surface of the first electrode 541, an insulating film (not shown) is formed for preventing leak due to discharge between the first electrode 541 and the second electrode 542 or the like. As the insulating film, $SiO_2$, TEOS (Tetra Ethoxy Silane), or the like may be used, and especially, $SiO_2$ having the same optical property as that of the glass substrate forming the first substrate 51 is preferable. In the case where $SiO_2$ is used as the insulating film, there is no light reflection between the first substrate 51 and the insulating film or the like. Thus, the insulating film may be formed on the entire surface of the first substrate 51 at the side facing the second substrate 52 after the first electrode 541 is formed on the first substrate.

From a part of the outer circumferential edge of the first electrode 541, in the etalon plan view as shown in FIG. 2, a first electrode lead part 541L is formed to extend toward the upper right of the etalon 5. Further, at the leading end of the first electrode lead part 541L, a first electrode pad 541P is formed and the first electrode pad 541P is connected to the voltage control unit 6 (see FIG. 1).

When the electrostatic actuator 54 is driven, a voltage is applied to the first electrode pad 541P by the voltage control unit 6 (see FIG. 1).

The mirror fixing part 512 is formed in a nearly cylindrical shape having a smaller diameter dimension than that of the electrode formation groove 511 coaxially with the electrode formation groove 511, and includes the mirror fixing surface 512 at the side facing the second substrate 52.

Further, onto the mirror fixing part 512A, the circular fixed mirror 56 having a diameter of about 3 mm is fixed. The fixed mirror 56 is a mirror formed by a dielectric multilayer film containing $TiO_2$—$SiO_2$, and formed on the mirror fixing surface 512A using a method of sputtering or the like.

Note that, in the embodiment, an example of using the mirror of the dielectric multilayer film containing $TiO_2$—$SiO_2$ as the fixed mirror 56 is shown, however, a mirror of an Ag alloy single layer that can cover the entire visible light range as a spectroscopically separable wavelength range, for example, may be used.

Note that, in the embodiment, as shown in FIG. 3, an example in which the mirror fixing surface 512A of the mirror fixing part 512 facing the second substrate 52 is formed closer to the second substrate 52 than the electrode fixing surface 511A is shown, however, not limited to that. The height positions of the electrode fixing surface 511A and the mirror fixing surface 512A are appropriately set according to the dimension of the gap between mirrors G between the fixed mirror 56 fixed to the mirror fixing surface 512A and the movable mirror 57 formed on the second substrate 52, the dimension between the first electrode 541 and the second substrate 542 formed on the second substrate 52, which will be described later, and the thickness dimensions of the fixed mirror 56 and the movable mirror 57, and not limited to the above described configuration. For example, in the case where dielectric multilayer film mirrors are used as the mirrors 56, 57 and their thickness dimensions increase, a configuration in which the electrode fixing surface 511A and the mirror fixing surface 512A are formed on the same surface, or a configuration in which a mirror fixing groove as a cylindrically recessed groove is formed at the center of the electrode fixing surface 511A and the mirror fixing surface 512A is formed on the bottom surface of the mirror fixing groove may be employed.

Further, it is preferable that the groove depth of the mirror fixing surface 512A of the mirror fixing part 512 is designed in consideration of the wavelength range transmitted through the etalon 5. For example, in the embodiment, the initial value of the gap between mirrors G between the fixed mirror 56 and the movable mirror 57 (the dimension of the gap between mirrors G under the condition that no voltage is applied between the first electrode 541 and a second electrode 542) is set to 450 nm, and, by applying a voltage between the first electrode 541 and the second electrode 542, the movable mirror 57 can be displaced until the gap between mirrors G becomes 250 nm, for example. Thereby, by varying the voltage between the first electrode 541 and the second electrode 542, the lights having wavelengths in the entire visible light range can be selectively and spectroscopically separated and transmitted. In this case, the thickness dimensions of the fixed mirror 56 and the movable mirror 57 and the height dimensions of the mirror fixing surface 512A and the electrode fixing surface 511A may be set to values that can displace the gap between mirrors G from 250 nm to 450 nm.

Here, the surface in the bonded part 513 of the first substrate 51 facing the second substrate is the bonded surface 513A of the first substrate 51. On the bonded surface 513A, as shown in FIG. 3, the bonding layer 53 for bonding is formed in a film. For the bonding layer 53, a plasma-polymerized film using polyorganosiloxane as a principal material or the like may be used.

3-1-2. Configuration of Second Substrate

The second substrate 52 is formed by processing a quartz glass base material ($SiO_2$: silicon dioxide) having a thickness of 200 μm, for example, by etching. Specifically, as shown in FIG. 2, a displacement part 521 having a circular shape around a substrate center point and a bonded part 524 are formed on the second substrate 52 by isotropic wet-etching using HF (hydrogen fluoride) or the like in the etalon plan view. Further, as shown in FIG. 3, the displacement part 521 includes a cylindrical movable part 522 and a connection holding part 523 that is coaxial with the movable part 522, formed in an annular shape in the etalon plan view, and holds the movable part 522 movably in the thickness direction of the second substrate 52.

The displacement part 521 and the bonded part 524 are formed by forming grooves on a plate-like glass base member as a formation material of the second substrate 52 by etching. Specifically, the displacement part 521 and the bonded part 524 are formed by forming an annular first groove part 521A on a first surface 52A of the second substrate 52 facing the first substrate 51 and an annular second groove part 521B on a second surface 52B of the second substrate 52 opposite to the first substrate 51 by isotropic wet-etching using an etchant of HF or the like.

Here, the first groove part 521A has a first bottom surface 521A1 formed in an annular shape in parallel to the movable surface 522A, and a first inner side surface 521A2 as a part of the movable part 522 and the bonded part 524. Further, the second groove part 521B includes a second bottom surface 521B1 formed in an annular shape in parallel to the movable surface 522A, and a second inner side surface 521B2 as a part of the movable part 522 and the bonded part 524.

The movable part 522 is formed to have a thickness dimension larger than that of the connection holding part 523, and, for example, in the embodiment, formed to have the same dimension of 200 μm as the thickness dimension of the second substrate 52. The diameter dimension of the movable part 522 is formed larger than the diameter dimension of the mirror fixing part 512 of the first substrate 51. Further, on the first surface 52A of the movable part 522 facing the first substrate, the movable surface 522A in parallel to the mirror fixing surface 512A of the first substrate 51 is provided, and the movable mirror 57 and the second electrode 542 are fixed to the movable surface 522A.

Here, the movable mirror 57 has the same configuration as that of the above described fixed mirror 56 and has a circular shape having a diameter of 3 mm, for example. In the embodiment, a mirror with a dielectric multilayer film containing $TiO_2$—$SiO_2$ is used therefor.

The second electrode 542 is formed in a ring shape and opposed to the first electrode 541 with a predetermined dimension in between. Here, the electrostatic actuator 54 as a gap-adjustable part according to the invention is formed by the second electrode 542 and the above described first electrode 541. For the second electrode 542, a metal layered product of Au/Cr or the like may be used.

From a part of the outer circumferential edge of the first electrode 542, in the etalon plan view as shown in FIG. 2, a second electrode lead part 542L is formed to extend toward the lower left of the etalon 5. Further, at the leading end of the second electrode lead part 542L, a second electrode pad 542P is formed and connected to the voltage control unit 6 like the first electrode pad 541P.

When the electrostatic actuator 54 is driven, a voltage is applied to the second electrode pad 542P by the voltage control unit 6 (see FIG. 1).

The connection holding part 523 is a diaphragm surrounding the movable part 522 and formed by a region where the first bottom surface 521A1 of the first groove part 521A and the second bottom surface 521B1 of the second groove part 521B overlap in the etalon plan view. Further, the respective bottom surfaces 521A1, 521B1 are formed to have equal areas, and the thickness dimension between the respective bottom surfaces 521A1, 521Ba is the thickness dimension of the connection holding part 523 and formed to be 30 μm, for example. The connection holding part 523 is adapted to be formed in the center position in the thickness direction of the second substrate 52 because the depth dimensions D1, D2 of the first groove part 521A and the second groove part 521B are formed to be equal dimensions. That is, to form the connection holding part 523, in the embodiment, opening areas of the respective groove parts 521A, 521B are formed to be equal and opening edges 521A3, 521B3 of the respective groove parts 521A, 521B may be formed to overlap in the etalon plan view.

Here, the surface facing the bonded surface 513A of the first substrate 51 in the bonded part 524 of the second substrate 52 is a bonded surface 524A. On the bonded surface 524A, like the bonded surface 513A of the first substrate 51, the bonding layer 53 using polyorganosiloxane as a principal material is provided.

3-2. Configuration of Voltage Control Unit

The voltage control unit 6 controls voltages applied to the first electrode 541 and the second electrode 542 of the electrostatic actuator 54 based on the control signals input from the control unit 4.

4. Configuration of Control Unit

The control unit 4 controls the entire operation of the colorimetric instrument 1. As the control unit 4, for example, a general-purpose personal computer, a portable information terminal, and further, a colorimetry-dedicated computer or the like may be used.

Further, the control unit 4 includes a light source control part 41, a colorimetric sensor control part 42, a colorimetric processing part 43 (analytical processing part), etc. as shown in FIG. 1.

The light source control part 41 is connected to the light source unit 2. Further, the light source control part 41 outputs a predetermined control signal to the light source unit 2 based on the setting input by a user, for example, and allows the light source unit 2 to output white light with predetermined brightness.

The colorimetric sensor control part 42 is connected to the colorimetric sensor 3. Further, the colorimetric sensor control part 42 sets the wavelength of light to be received by the colorimetric sensor 3 based on the setting input by a user, for example, and outputs a control signal for detection of the amount of received light having the wavelength to the colorimetric sensor 3. Thereby, the voltage control unit 6 of the colorimetric sensor 3 sets the voltage applied to the electrostatic actuator 54 so that only the wavelength of the light desired by the user may be transmitted based on the control signal.

The colorimetric processing part 43 controls the colorimetric sensor control part 42 to vary the gap between mirrors of the etalon 5 and changes the wavelength of the light transmitted through the etalon 5. Further, the colorimetric processing part 43 acquires the amount of light transmitted through the etalon 5 based on the light reception signal input from the light receiving device 31. Furthermore, the colorimetric processing part 43 calculates the chromaticity of light reflected by the test object A based on the amounts of received light of the respective wavelengths obtained as above.

5. Manufacturing Method of Etalon

Next, a manufacturing method of the etalon 5 will be explained with reference to FIGS. 4A to 5E.

To manufacture the etalon 5, the first substrate 51 and the second substrate 52 are respectively manufactured, and the formed first substrate 51 and second substrate 52 are bonded.

5-1. Manufacturing Process of First Substrate

Figure 4A:
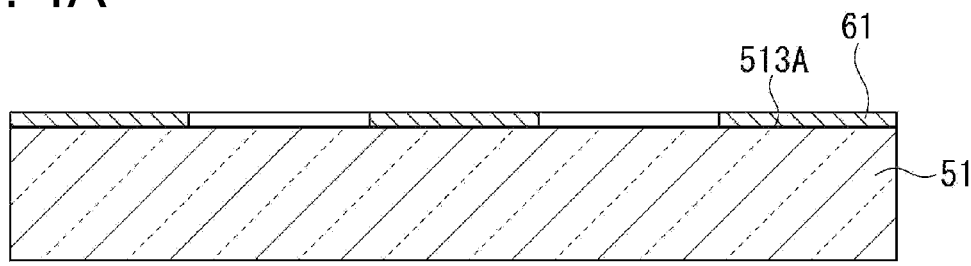
FIGS. 4A to 4D show a manufacturing process of a first substrate of the etalon of the first embodiment.

First, a quartz glass substrate having a thickness dimension of 500 μm as the formation material of the first substrate 51 is prepared, and both sides are precision-polished until the surface roughness Ra of the quartz glass substrate becomes 1 nm or less. Then, a resist 61 for forming the electrode formation groove 511 is applied to the surface of the first substrate 51 facing the second substrate 52, the applied resist 61 is exposed to light and developed by photolithography, and the location where the electrode formation groove 511 is formed is patterned as shown in FIG. 4A.

Figure 4B:
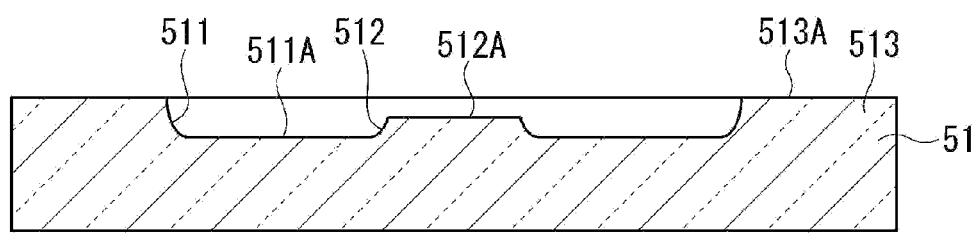

Then, the first substrate 51 is dipped in the etchant of HF or the like and isotropic wet-etching is performed. Thereby, as shown in FIG. 4B, the electrode formation groove 511 is etched to have a desired depth dimension, and the electrode fixing surface 511A is formed on the surface of the first substrate 51 facing the second substrate 52. Further, the mirror fixing part 512A is formed by etching to a desired position. Then, the resist 61 is removed.

Figure 4C:
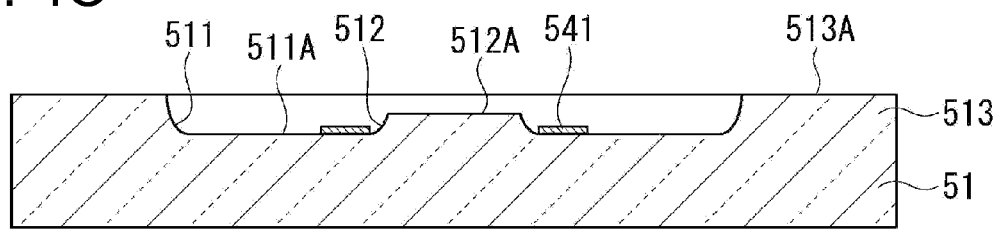

Next, an ITO film is formed by sputtering on the electrode fixing surface 511A on the surface at the side of the first substrate 51 facing the second substrate 52. Then, on the ITO film, a resist having a desired electrode pattern is formed, the ITO film is photo-etched, and the first electrode 541 is formed on the electrode fixing surface 511A as shown in FIG. 4C. Then, the resist left on the surface of the first substrate 51 facing the second substrate 52 is removed.

Figure 4D:
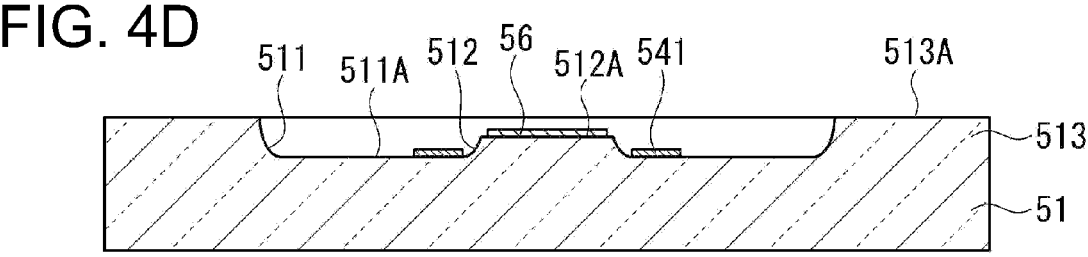

Next, a resist having a pattern for exposing only the region for forming the fixing mirror 56 is formed on the mirror fixing part 512A at the side of the first substrate 51 facing the second substrate 52, and a thin film containing $TiO_2$—$SiO_2$ is formed by sputtering or evaporation. Then, the resist is removed, and the fixing mirror 56 is formed on the mirror fixing part 512A as shown in FIG. 4D.

In this manner, the first substrate 51 is formed.

5-2. Manufacturing Process of Second Substrate

Figure 5A:
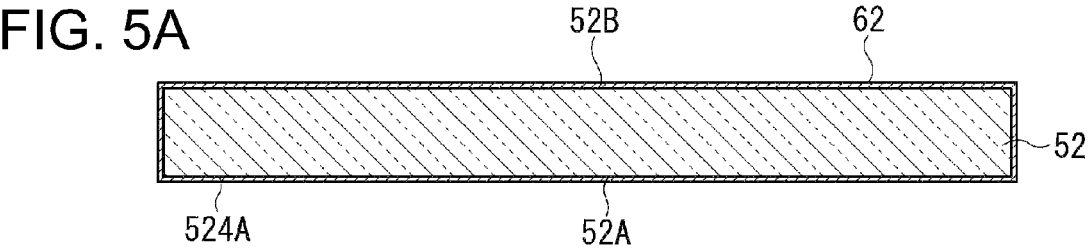
FIGS. 5A to 5E show a manufacturing process of a second substrate of the etalon of the first embodiment.
Figure 5B:
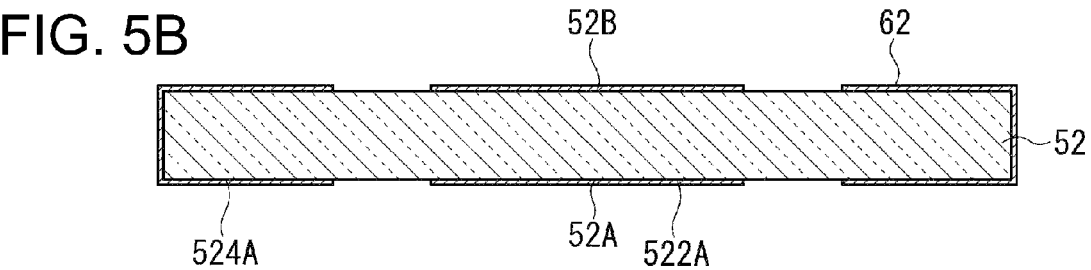
Figure 5C:
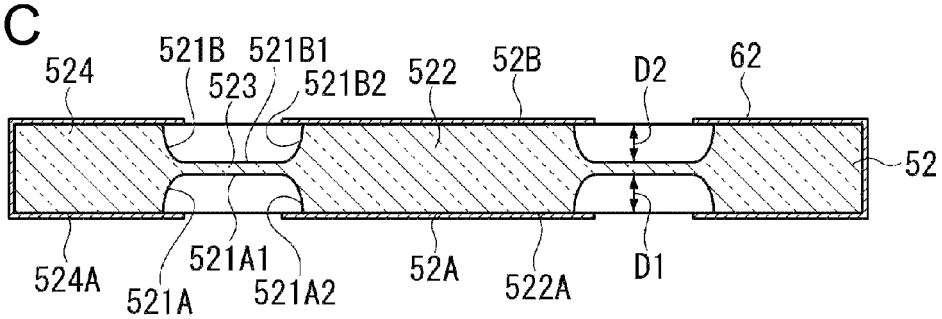

A quartz glass substrate having a thickness dimension of 200 μm as the formation material of the second substrate 52 is prepared, and both sides are precision-polished until the surface roughness Ra of the quartz glass substrate becomes 1 nm or less. Then, a resist 62 is applied on the entire surface of the second substrate 52 (resist application step) as shown in FIG. 5A. Then, the applied resist 62 is exposed to light and developed by photolithography, and the location where the connection holding part 523 is formed is patterned (light exposure and development step) as shown in FIG. 5B. In this regard, the pattern for forming the connection holding part 523 is formed in an annular shape in a position overlapping with the first surface 52A and the second surface 52B of the second substrate 52 in the etalon plan view.

Then, the second substrate 52 is dipped in the etchant of HF or the like and wet-etching is performed until the first surface 52A and the second surface 52B of the second substrate 52 have desired depth dimensions. In this regard, since the correspondence between the time for which the substrate is dipped in the etchant and the depth dimension to which the substrate is etched has been already known, the second substrate 52 is dipped for a predetermined time in the etchant and the depth dimensions D1, D2 of the first groove part 521A and the second groove part 521B are formed to be equal. In this regard, the patterned locations are the respective bottom surfaces 521A1 and 521B1 of the respective groove parts 521A, 521B, and the parts between the respective bottom surfaces 521A1 and 521B1 to the opening edges 521A3, 521B3 of the respective groove parts 521A, 521B are parts of side etching of the respective groove parts 521A, 521B and the respective inner side surfaces 521A2, 521B2. In this manner, the areas of the respective bottom surfaces 521A1 and 521B1 are formed to be equal and the opening edges 521A3, 521B3 of the respective groove parts 521A, 521B overlap in the etalon plan view (groove part formation step).

Then, the resist 62 is removed, and the connection holding part 523 having the thickness of 50 μm is formed in the center part in the thickness direction of the second substrate 52 and the movable part 522 and the bonded part 524 are formed (resist removal step).

Figure 5D:
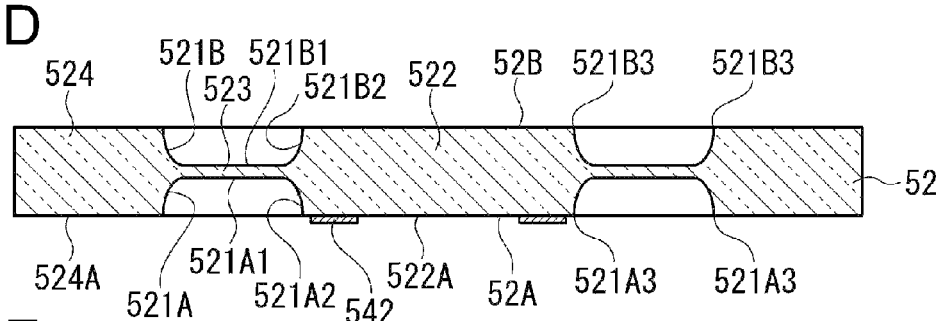

Next, a resist (liftoff pattern) is formed in parts other than the formation part of the second electrode 542 of the first surface 52A of the second substrate 52. Then, an ITO layer is formed by sputtering. Then, the resist is removed. Thereby, as shown in FIG. 5D, the second electrode 542 is formed on the movable surface 522A of the movable part 522.

Figure 5E:
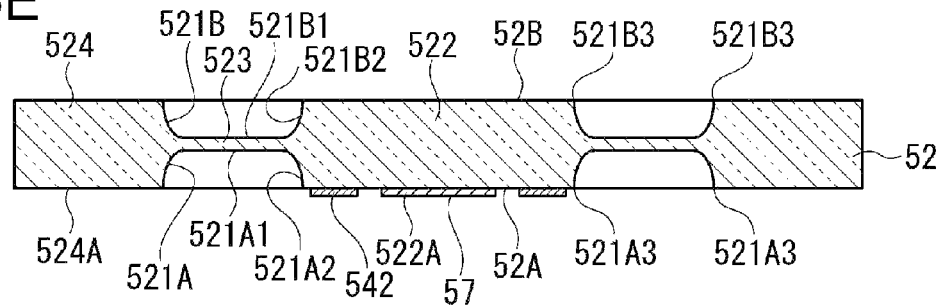

Then, a resist (liftoff pattern) is formed in parts other than the formation part of the movable mirror 57 of the movable surface 522A of the movable part 522. Then, a thin film containing $TiO_2$-$SiO_2$ is formed by sputtering. Then, the resist is removed, and the movable mirror 57 in a circular shape having a diameter of about 3 mm is formed on the movable surface 522A of the movable part 522 as shown in FIG. 5E.

In this manner, the second substrate 52 is formed.

5-3. Bonding Process

Next, the respective substrates 51, 52 formed in the above described manufacturing process of the first substrate and manufacturing process of the second substrate are bonded (bonding step). Specifically, in order to provide activation energy to the plasma-polymerized film forming the bonding layer 53 formed on the bonded surfaces 513A, 524A of the respective substrates 51, 52, $O_2$ plasma treatment or UV treatment is performed. The $O_2$ plasma treatment is performed for 30 seconds under the condition that $O_2$ flow is 30 cc/min, pressure is 27 Pa, and RF power is 200 W. Further, the UV treatment is performed for three minutes using excimer UV (wavelength 172 nm) as a UV light source. After the activation energy is provided to the plasma-polymerized film, alignment of the two substrates 51, 52 is performed, the bonded surfaces 513A, 524A are superimposed via the bonding layer 53, load is applied to the bonded parts 513, 524, and thereby, the substrates 51, 52 are bonded to each other. In this regard, in the embodiment, since the opening edges 521A3, 521B3 of the respective groove parts 521A, 521B overlap in the etalon plan view, the bonded surface 524A of the bonded part 524 and the surface opposite to the bonded surface 524A have equal areas. Then, at the bonding step, when load is applied from the surface opposite to the bonded surface 524A, the load is transmitted to the entire bonded surface 524A and the load is uniformly applied to the bonded part 513.

In this manner, the etalon 5 is manufactured.

6. Advantages of First Embodiment

According to the etalon 5 according to the above described first embodiment, there are the following advantages.

(1) The first groove part 521A and the second groove part 521B are formed by isotropic wet-etching on the first surface 52A and the second surface 52B of the second substrate 52, and thereby, the connection holding part 523 is formed by the respective bottom surfaces 521A1 and 521B1 of the respective groove parts 521A, 521B. Thus, in comparison to the depth dimension of the groove part formed only on one surface of the above described substrate in related art, the depth dimensions D1, D2 of the respective groove parts 521A, 521B may be made smaller, and the connection holding part 523 having the desired thickness dimension may be formed. Since the depth dimensions D1, D2 of the respective groove parts 521A, 521B may be made smaller than that in related art, the side etching of the inner side surfaces 521A2, 521B2 of the respective groove parts 521A, 521B may be made smaller, and spread of the opening edges 521A3, 521B3 of the respective groove parts 521A, 521B may be suppressed. Therefore, while the regions of the bonded parts 513, 524 for bonding of the substrates 51, 52 and the movable part 522 may be formed larger without using larger substrates in advance, the respective substrates 51, 52 may be downsized.

(2) Since the respective groove parts 521A, 521B are formed by isotropic wet-etching on the first surface 52A and the second surface 52B of the second substrate 52, by dipping the second substrate 52 in the etchant of HF or the like, the respective groove parts 521A, 521B may be formed on the respective surfaces 52A, 52B of the second substrate 52 at the same time, respectively. That is, in comparison to the etching time when the diaphragm having the desired thickness dimension is formed by forming the groove part by etching only on one surface of the above described substrate in related art, the etching time for forming the connection holding part 523 having the desired thickness dimension may be shortened.

(3) In comparison to the etching time when the groove part is formed only on one surface of the above described substrate in related art, in the embodiment, the depth dimensions D1, D2 of the respective groove parts 521A, 521B are formed to be equal dimensions by isotropic wet-etching, and the etching time for forming the connection holding part 523 having the desired thickness dimension may be shortened to half.

Second Embodiment

As below, the second embodiment according to the invention will be explained with reference to FIGS. 6 and 7.

An etalon 5A of the embodiment has the similar configuration as that of the etalon 5 of the first embodiment. The etalons are different in that the areas of the respective bottom surfaces 521A1, 521B1 of the first groove part 521A and the second groove part 521B of the etalon 5 are formed to be equal, however, the areas of the respective bottom surfaces 521A1, 521B1 of the first groove part 521A and the second groove part 521B of the etalon 5A of the embodiment are different and the area of the second bottom surface 521B1 of the second groove part 521B is formed larger than the area of the first bottom surface 521A1 of the first groove part 521A.

In the following description, the same signs are assigned to the same component elements as those of the first embodiment and their explanation will be omitted.

Figure 6:
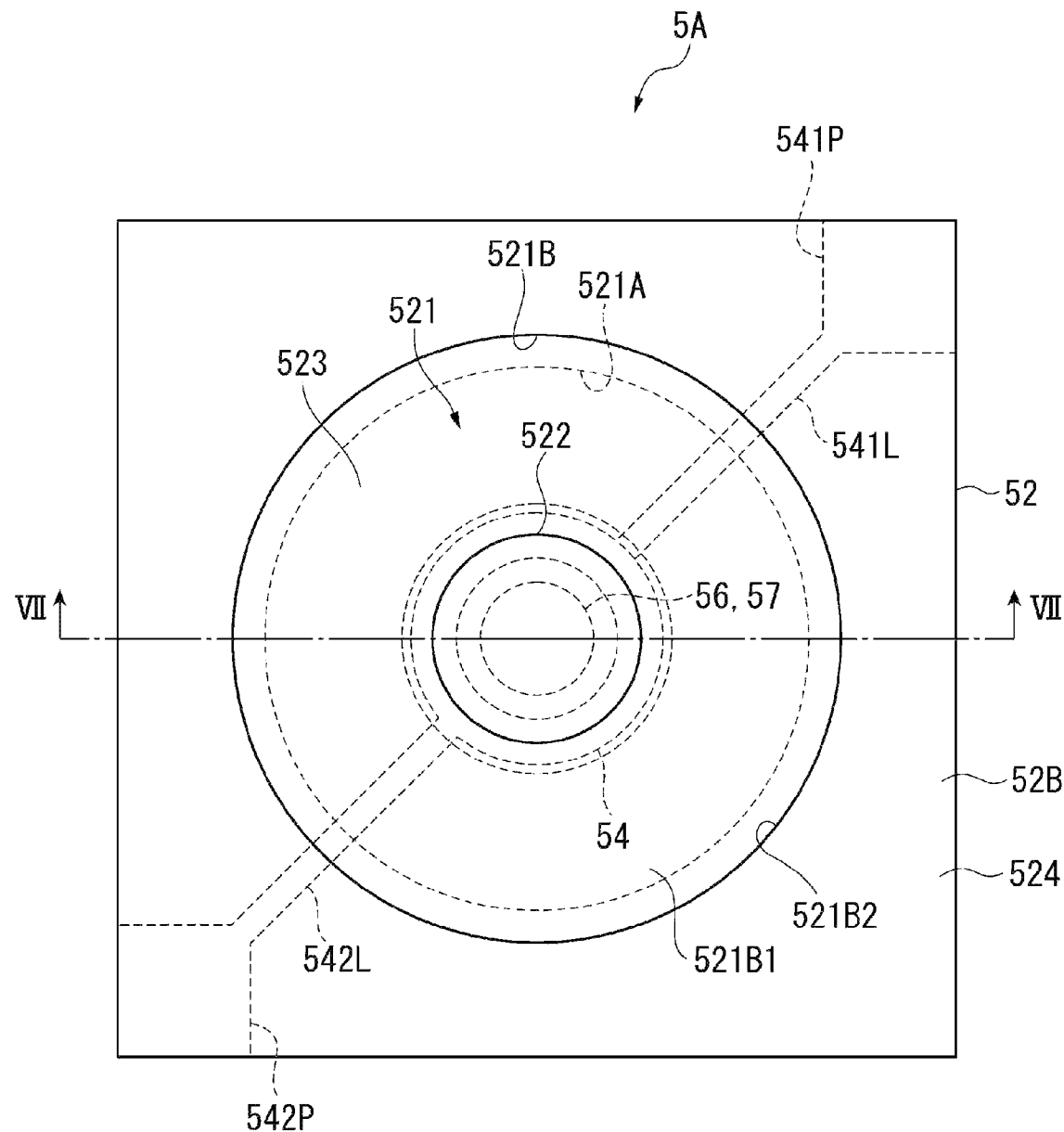
FIG. 6 is a plan view showing a schematic configuration of an etalon of a second embodiment according to the invention.
Figure 7:
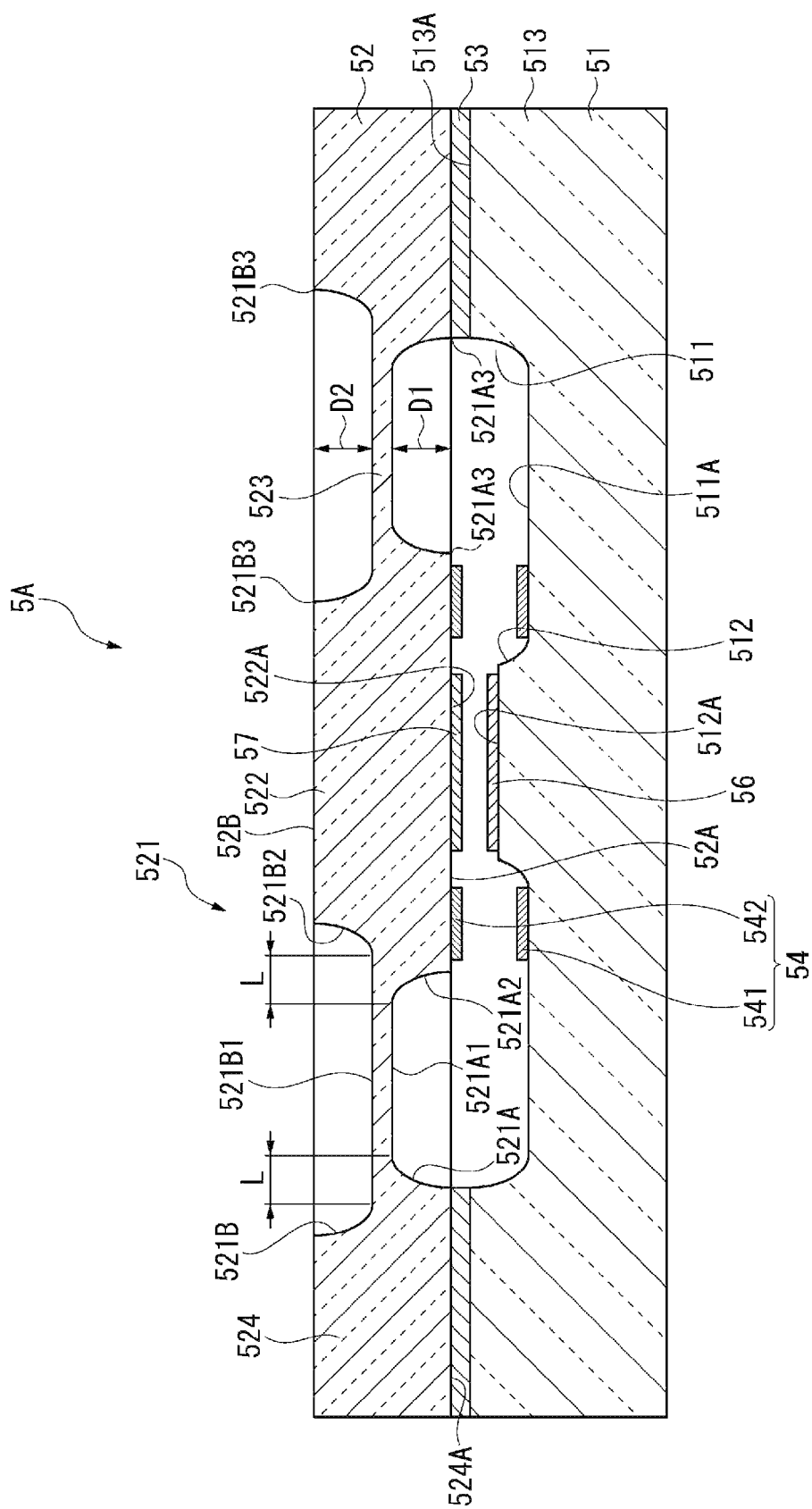
FIG. 7 is a sectional view showing a schematic configuration of the etalon of the second embodiment.

In the etalon 5A according to the embodiment, as shown in FIGS. 6 and 7, the area of the second bottom surface 521B1 of the second groove part 521B of the second substrate 52 is formed larger than the area of the first bottom surface 521A1 of the first groove part 521A and the first bottom surface 521A1 of the first groove part 521A is located within the region of the second bottom surface 521B1 of the second groove part 521B in the etalon plan view. In the embodiment, the region of the first bottom surface 521A1 of the first groove part 521A corresponds to the region of the connection holding part 523. Note that, in the sectional view of the etalon 5A shown in FIG. 7, the dimension difference L between the edge in the first bottom surface 521A1 of the first groove part 521A and the edge in the second bottom surface 521B1 of the second groove part 521B is set to about 10 μm. The dimension difference L is the same as those in the third and fourth embodiments, which will be described later.

FIGS. 8A to 8E show a manufacturing process of the second substrate 52 of the etalon 5A of the embodiment. Note that, in the description of the manufacturing process of the second substrate 52 of the embodiment, the step of FIG. 8B that differs from that of the manufacturing process of the second substrate 52 of the first embodiment will be mainly explained and the other steps are the same as those of the first embodiment and their explanation will be simplified.

Figure 8A:
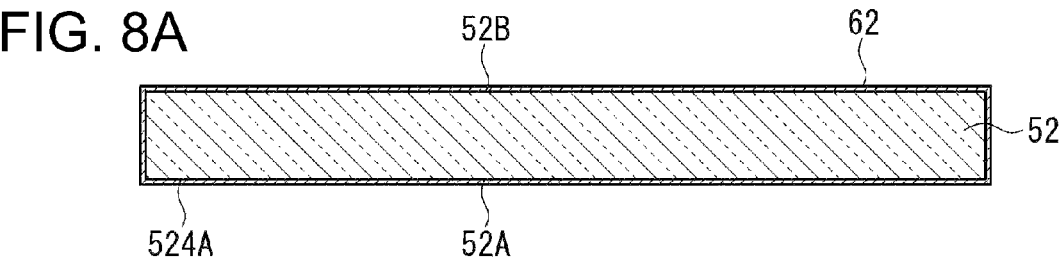
FIGS. 8A to 8E show a manufacturing process of a second substrate of the etalon of the second embodiment.
Figure 8B:
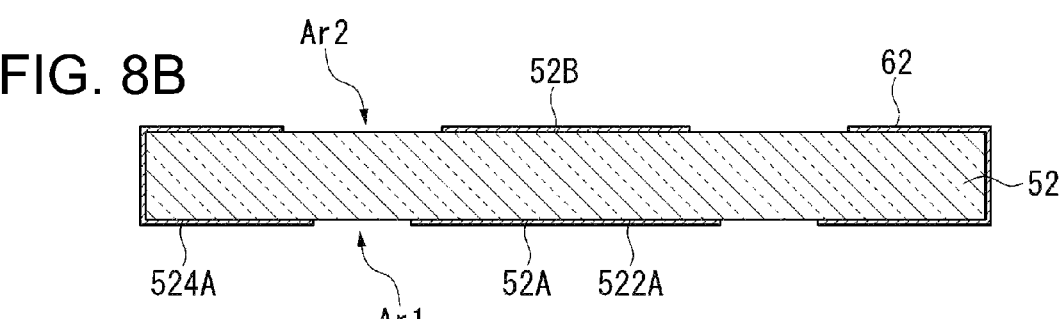

A light shielding film is formed on the entire surface of the second substrate 52. (The light shielding film is not shown in FIG. 8A to 8E.) As shown in FIG. 8B, the resist 62 applied on the shielding film. Then the resist 62 is exposed to light and developed by photolithography, and the location where the connection holding part 523 is formed is patterned (light exposure and development step). In this regard, the region Ar1 patterned on the first surface 52A of the second substrate 52 is smaller than the region Ar2 patterned on the second surface 52B.

This is because it is difficult to accurately form the patterns of the same regions on the respective surfaces 52A, 52B and an error of about 5 μm typically occurs, and therefore, if the regions to be patterned on the respective surfaces 52A, 52B are positively differentiated, it is not necessary to consider the above described error. Accordingly, for example, if it is desired that the area of the bottom surface of the groove part is secured larger, the region to be patterned is made larger, and, if it is desired that the area of the bottom surface of the groove part is secured smaller, the region to be patterned is made smaller.

Figure 8C:
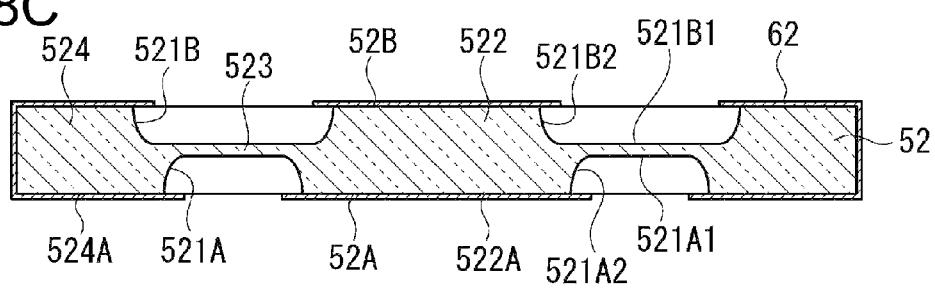
Figure 8D:
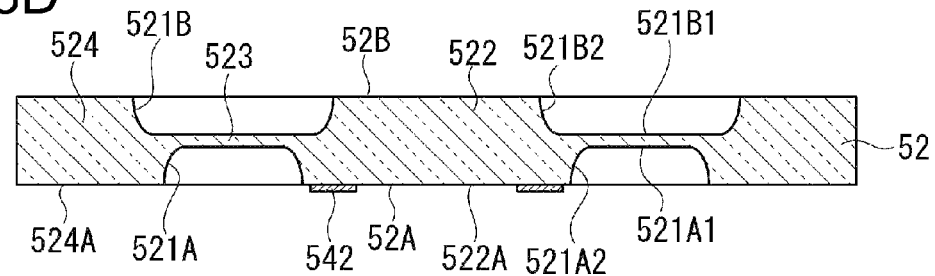
Figure 8E:
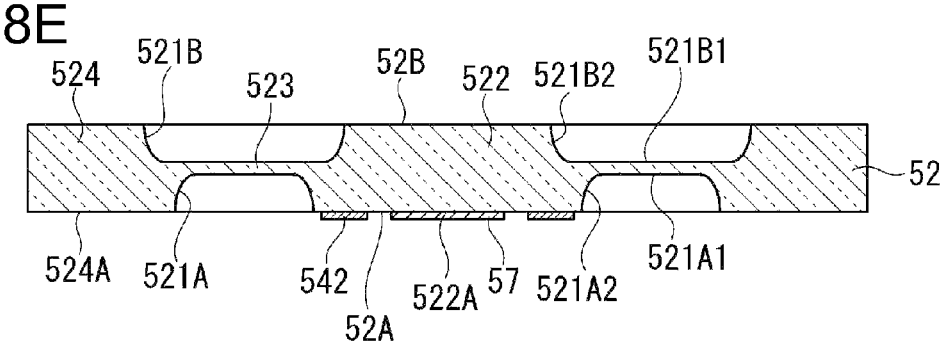

Then, the light shielding film formed in the region Ar1 and the region Ar2 are etched. As is the case of the first embodiment, the second substrate 52 is dipped in the etchant of HF or the like and isotropic wet-etching is performed and the first groove part 521A and the second groove part 521B are formed as shown in FIG. 8C, and the second electrode 542 and the movable mirror 57 are formed and the second substrate 52 is formed as shown in FIGS. 8D and 8E.

According to the etalon 5A according to the above described second embodiment, there are the following advantages in addition to the advantages (1) to (3) of the first embodiment.

According to the embodiment, if the area of the first bottom surface 521A1 of the first groove part 521A is determined in advance and the region Ar2 to be patterned in the second surface 52B (formation pattern for forming the bottom surface of the groove part) is positively made larger than the region Ar1 to be patterned in the first surface 52A, it is not necessary to consider the above described error. Then, if the first groove part 521A1 and the second groove part 521B1 are formed by isotropic etching, the area of the second bottom surface 521B1 of the second groove part 521B may be made larger than the area of the first bottom surface 521A1 of the first groove part 521A. Thereby, the first bottom surface 521A1 of the first groove part 521A is secured in the desired area without consideration of the above described error.

Further, since the area of the second bottom surface 521B1 of the second groove part 521B is larger than the area of the first bottom surface 521A1 of the first groove part 521A, when the respective substrates 51, 52 are aligned, the first bottom surface 521A1 of the first groove part 521A may be easily aligned within the region of the second bottom surface 521B1 of the second groove part 521B.

Third Embodiment

As below, the third embodiment according to the invention will be explained with reference to FIG. 9.

An etalon 5B of the embodiment has the similar configuration as that of the etalon 5 of the first embodiment. The etalons are different in that the depth dimensions D1, D2 of the first groove part 521A and the second groove part 521B of the etalon 5 are formed to be equal dimensions and the areas of the respective bottom surfaces 521A1, 521B1 of the first groove part 521A and the second groove part 521B are formed to be equal, however, the depth dimension D1 of the first groove part 521A of the etalon 5B of the embodiment is formed smaller than the depth dimension D2 of the second groove part 521B and the area of the second bottom surface 521B1 of the second groove part 521B is formed larger than the area of the first bottom surface 521A1 of the first groove part 521A. That is, the configuration of the etalon 5B of the embodiment is different in that the depth dimension D1 of the first groove part 521A of the etalon 5A of the second embodiment is smaller than the depth dimension D2 of the second groove part 521B.

Note that, in the following description, the same signs are assigned to the same component elements as those of the first embodiment and their explanation will be omitted.

Figure 9:
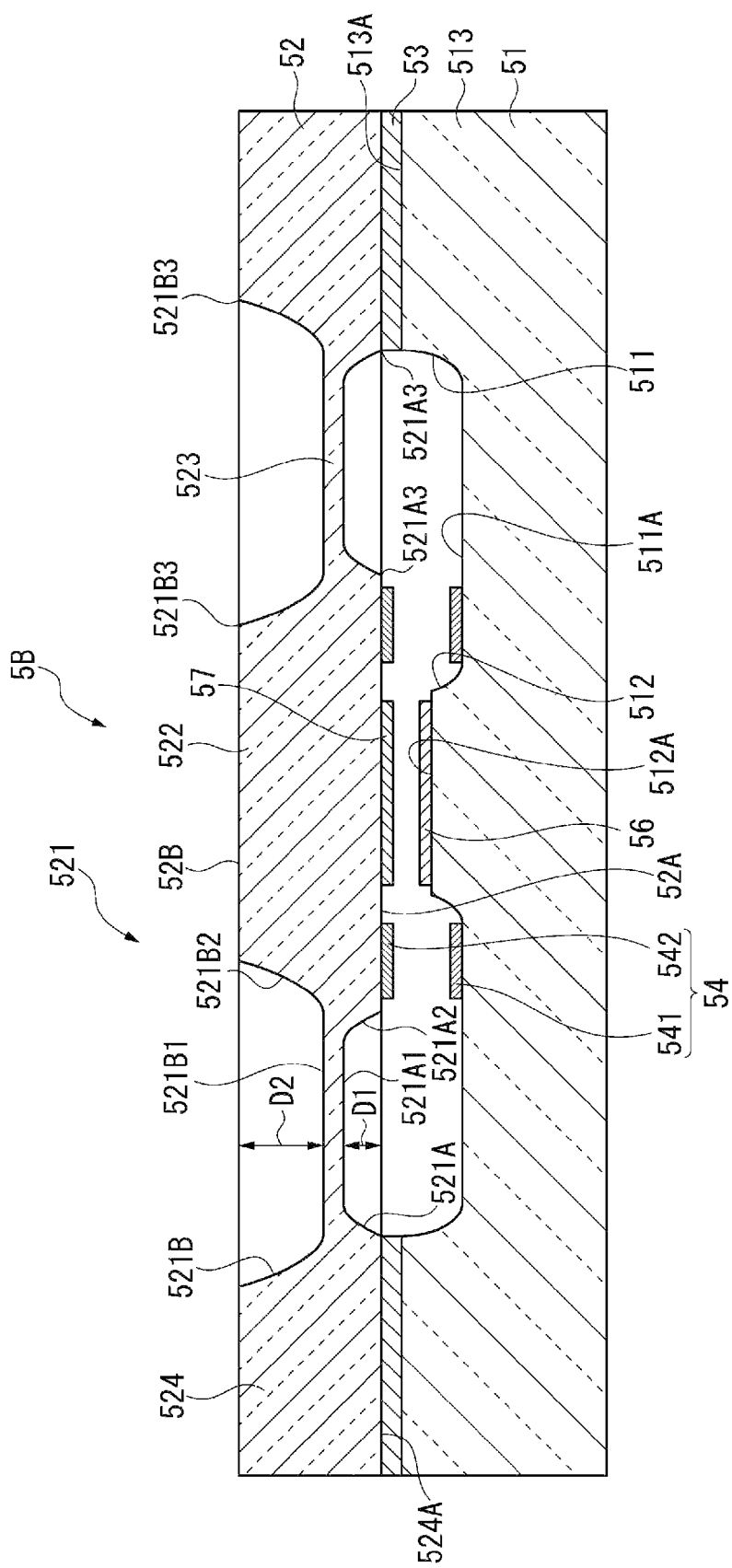
FIG. 9 is a sectional view showing a schematic configuration of an etalon of a third embodiment according to the invention.

In the etalon 5B according to the embodiment, as shown in FIG. 9, the depth dimension D1 of the first groove part 521A of the second substrate 52 is formed smaller than the depth dimension D2 of the second groove part 521B and the area of the second bottom surface 521B1 of the second groove part 521B is formed larger than the area of the first bottom surface 521A1 of the first groove part 521A. Also, in the embodiment, as is the case of the second embodiment, the region of the first bottom surface 521A1 of the first groove part 521A corresponds to the region of the connection holding part 523.

Since the depth dimension D1 of the first groove part 521A is formed smaller than the dimension D1 of the first groove part 521A of the etalon 5A of the second embodiment, the etching of the first inner side surface 521A2 of the first groove part 521A of the etalon 5B is smaller (side etching is smaller) and the opening area of the first groove part 521A is smaller.

According to the etalon 5B according to the above described third embodiment, the following advantages are exerted in addition to the advantages (1), (2) of the first embodiment and the advantages of the second embodiment.

According to the embodiment, in comparison to the first embodiment and the second embodiment, the depth dimension D1 of the first groove part 521A is formed smaller, and the side etching of the first groove part 521A is made even smaller. Therefore, the opening area of the first groove part 521A may be made smaller than those in the first embodiment and the second embodiment, and the region of the bonded surface 524A may be formed even larger. Thus, even in the case where alignment when the respective substrates 51, 52 are bonded to each other is slightly unsuccessful, the respective substrates 51, 52 may be reliably bonded to each other.

Fourth Embodiment

As below, the fourth embodiment according to the invention will be explained with reference to FIG. 10.

An etalon 5C of the embodiment has the similar configuration as that of the etalon 5A of the second embodiment. The etalons are different in that the depth dimensions D1, D2 of the first groove part 521A and the second groove part 521B of the etalon 5A are formed to be equal dimensions, the area of the second bottom surface 521B1 of the second groove part 521B is formed larger than the area of the first bottom surface 521A1 of the first groove part 521A, and the opening area of the second groove part 521B is formed larger than the opening area of the first groove part 521A, however, the depth dimension D2 of the second groove part 521B of the etalon 5C of the embodiment is formed smaller than the depth dimension D1 of the first groove part 521A, the opening edges 521A3, 521B3 of the respective groove parts 521A, 521B overlap in the etalon plan view, and the opening areas of the respective groove parts 521A, 521B are formed to be equal.

Note that, in the following description, the same signs are assigned to the same component elements as those of the first embodiment and their explanation will be omitted.

Figure 10:
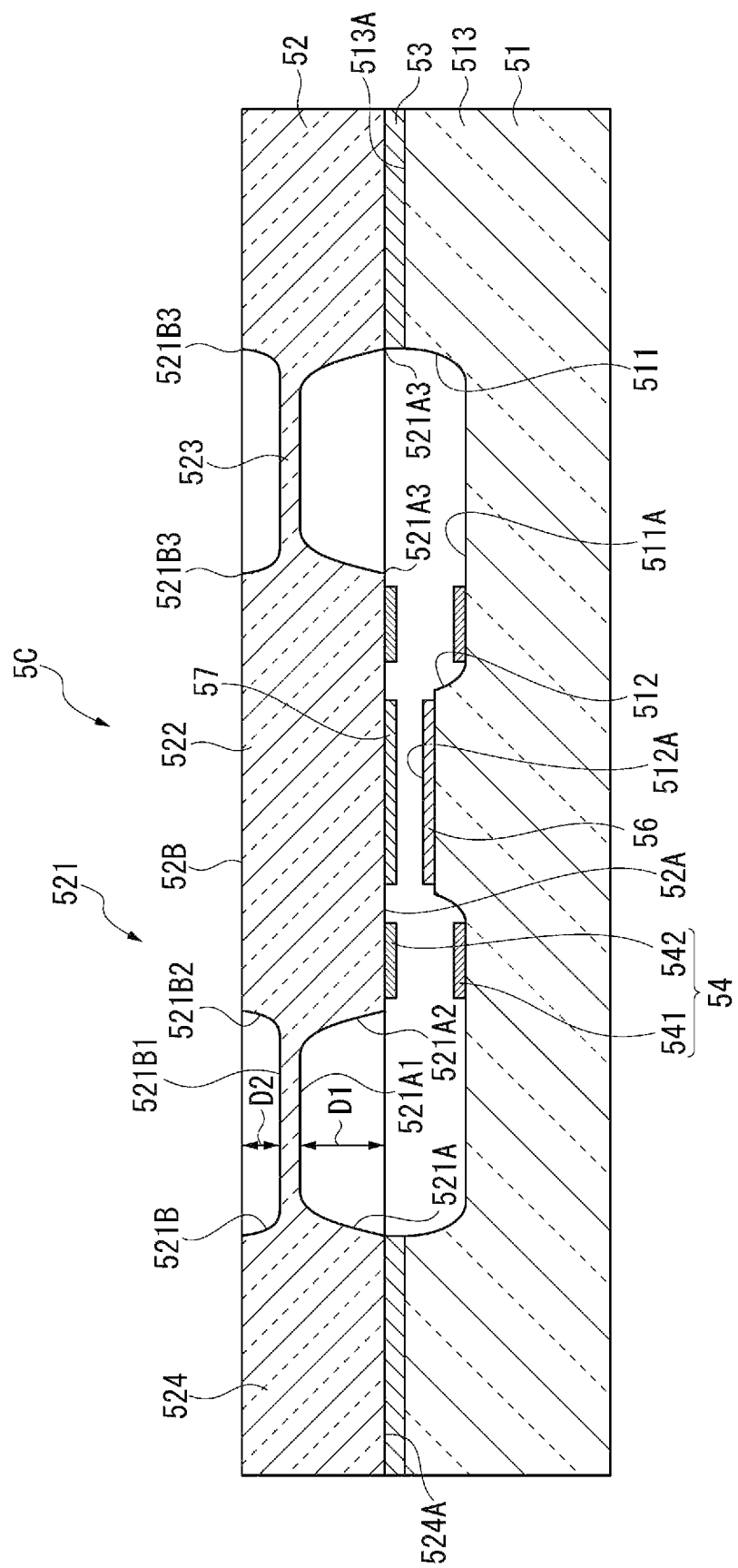
FIG. 10 is a sectional view showing a schematic configuration of an etalon of a fourth embodiment according to the invention.

In the etalon 5C according to the embodiment, as shown in FIG. 10, the depth dimension D1 of the first groove part 521A of the second substrate 52 is formed larger than the depth dimension D2 of the second groove part 521B and the area of the second bottom surface 521B1 of the second groove part 521B is formed larger than the area of the first bottom surface 521A1 of the first groove part 521A. That is, in the embodiment, the depth dimension D1 of the first groove part 521A having the smaller bottom surface area is formed larger than the depth dimension D2 of the second groove part 521B having the larger bottom surface area, and thus, the opening edges 521A3, 521B3 of the respective groove parts 521A, 521B overlap in the etalon plan view, and the opening areas of the respective groove parts 521A, 521B are formed to be equal.

According to the etalon 5C according to the above described fourth embodiment, there are the following advantages in addition to the advantages (1), (2) of the first embodiment.

According to the embodiment, in comparison to the first embodiment to the third embodiment, the depth dimension D2 of the second groove part 521B is formed smaller, and the side etching of the second groove part 521B is smaller. According thereto, in comparison to the first embodiment to the third embodiment, the opening area of the second groove part 521B may be made smaller, and the surface opposite to the bonded surface 524A in the bonded part 524 of the second substrate 52 may be formed larger.

Further, since the opening edge 521A3 of the first groove part 521A overlaps with the opening edge 521B3 of the second groove part 521B in the etalon plan view, even when the depth dimension D1 of the first groove part 521A is made larger than the depth dimension D2 of the second groove part 521B, the side etching of the first groove part 521A is not larger than the side etching of the second groove part 521B and the regions of the bonded surface 524A and the movable surface 522A may be sufficiently secured. Thereby, the second electrode 542 may be provided on the movable surface 522A, the dimension between the electrodes is smaller than in the case where the electrode is provided in the connection holding part 523, and the voltages applied to the respective electrodes may be lower and the power may be saved. Furthermore, the areas of the region of the bonded surface 524A and the region at the opposite side to the bonded surface 524A in the bonded part 524 may be made equal, and, at the bonding step, when the surface at the opposite side to the bonded surface 524A in the bonded part 524 is pressed, force may be applied to the entire bonded surface 524A and the workability of the bonded work of the substrates 51, 52 may be improved.

Modifications of Embodiments

Note that the invention is not limited to the above described embodiments, but includes modifications, improvements, etc. within the range that can achieve the advantages of the invention.

Figure 11:
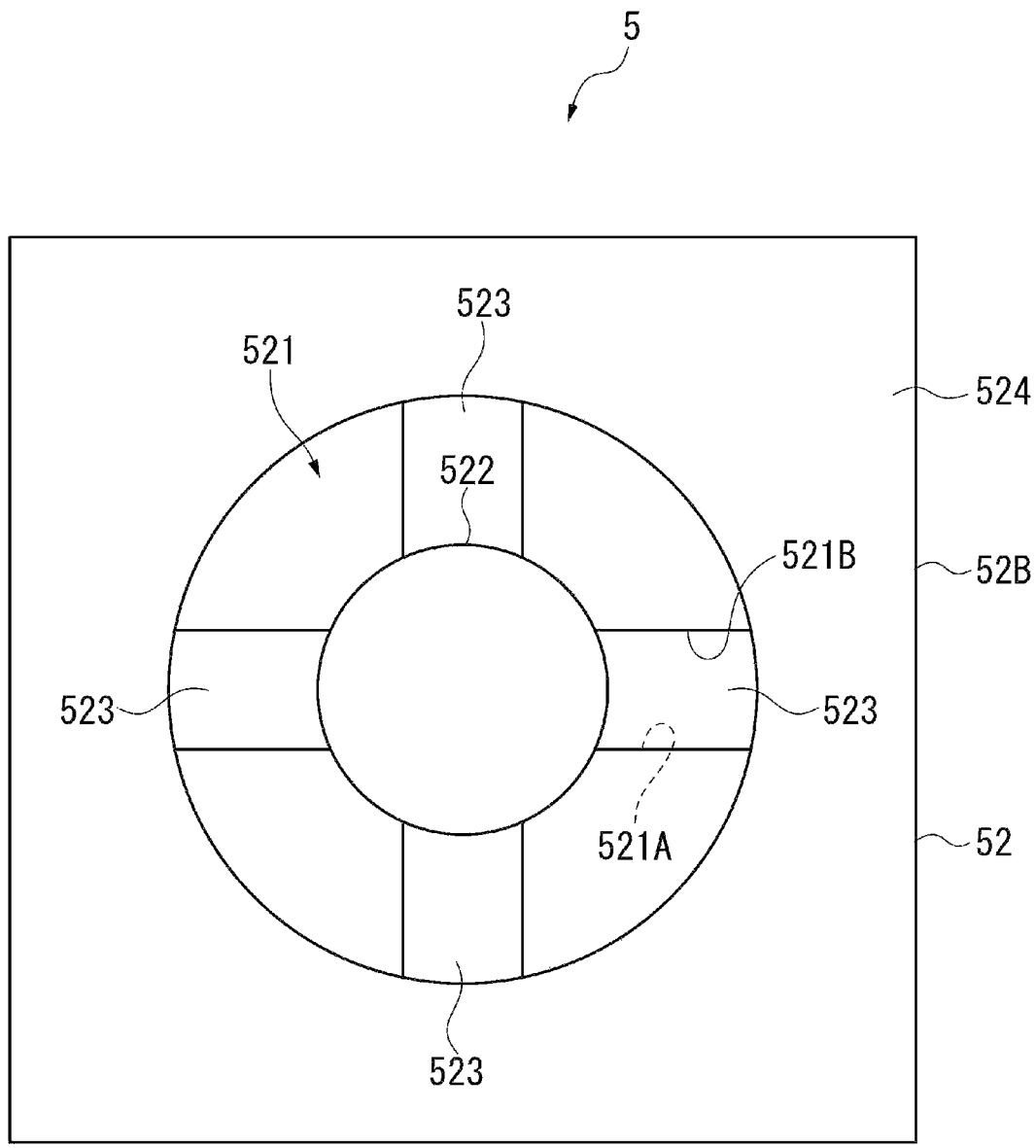
FIG. 11 shows a modified example according to the invention.

In the above described respective embodiments, the connection holding part 523 is the diaphragm surrounding the movable part 522, however, as shown in FIG. 11, the respective groove parts 521A, 521B may be formed in positions point-symmetrical with respect to the center point of the movable part 522 and the connection holding part 523 formed in a beam shape may be formed to sandwich the movable part 522.

Figure 12:
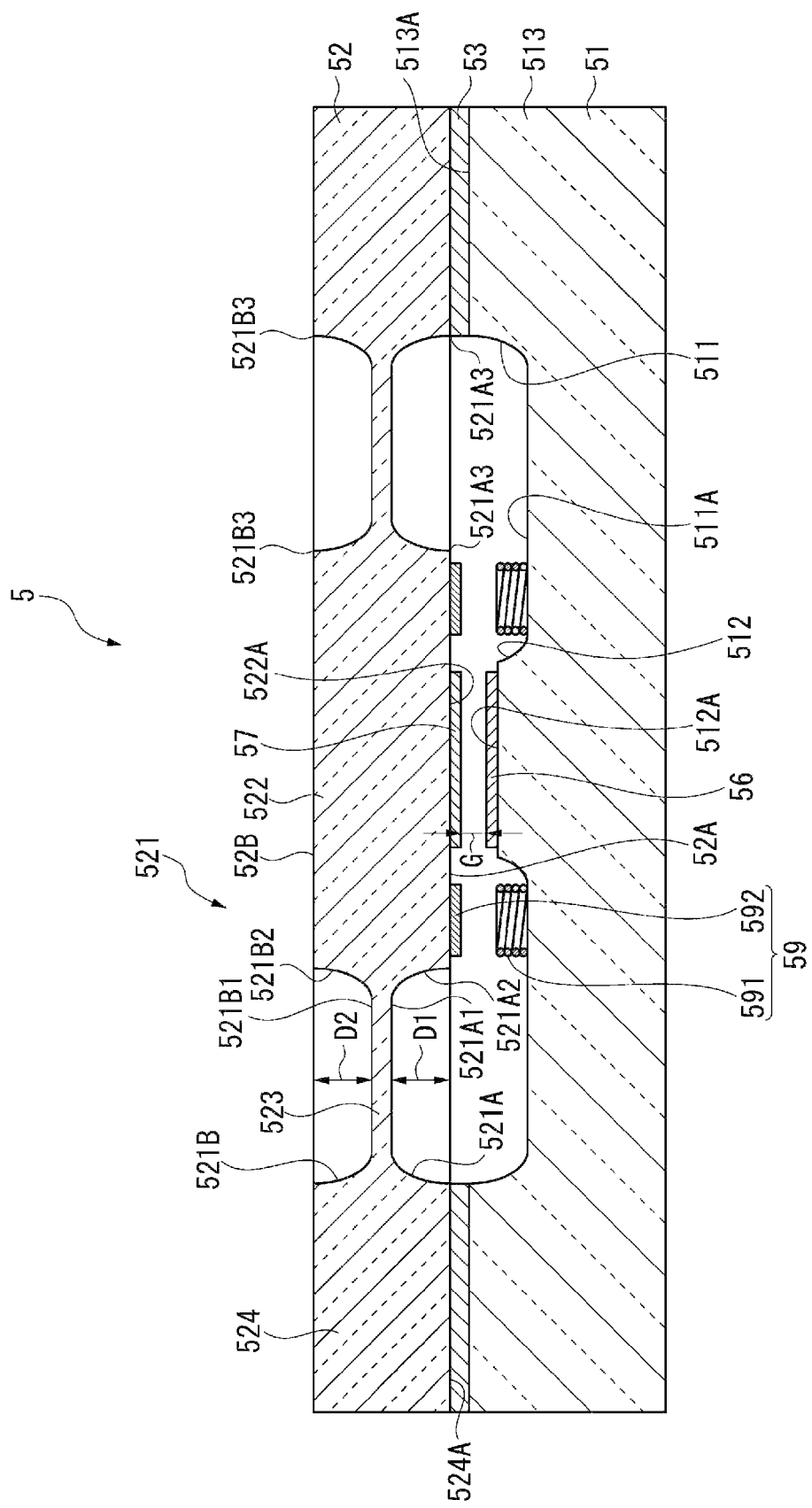
FIG. 12 shows a modified example according to the invention.

In the above described respective embodiments, the electrostatic actuator 54 is exemplified as a gap-adjustable part according to the invention, however, an electromagnetic actuator 59 as shown in FIG. 12 may be used. The electromagnetic actuator 59 includes an electromagnetic coil 591 in which a current is allowed to flow, and a permanent magnet 592 that moves relative to the electromagnetic coil 591 according to the electromagnetic force. The electromagnetic coil 591 is provided on the first electrode fixing surface 511A of the first substrate 51, the permanent magnet 592 is provided on the movable surface 522A of the connection holding part 523, and the electromagnetic coil 591 and the permanent magnet 592 are oppositely provided. Further, when a current is allowed to flow in the electromagnetic coil 591, the permanent magnet 592 moves toward the electromagnetic coil 591 according to the magnetic flux from the permanent magnet 592 and the electromagnetic force by the interaction of the magnetic flux and the current, and the displacement part 521 varies.

In the second embodiment, the area of the second bottom surface 521B1 of the second groove part 521B is formed larger than the area of the first bottom surface 521A1 of the first groove part 521A, however, the area may be made smaller. In this regard, if the area of the second bottom surface 521B1 of the second groove part 521B is formed smaller than the area of the first bottom surface 521A1 of the first groove part 521A while the size of the area of the first bottom surface 521A1 of the first groove part 521A is maintained, the opening area of the second groove part 521B may be made even smaller and the regions of the bonded part 524 and the movable part 522 may be made even larger.

In the third, fourth embodiments, the areas of the respective bottom surfaces 521A1, 521B1 of the respective groove parts 521A, 521B are different, however, the areas may be equal as in the first embodiment. In this regard, if the size of the area of the second groove part 521B is formed to be equal to that of the first groove part 521A having the smaller area, the opening area of the second groove part 521B may be made even smaller and the regions of the bonded part 524 and the movable part 522 may be secured larger.

In the fourth embodiment, the depth dimension D1 of the first groove part 521A is formed larger than the depth dimension D2 of the second groove part 521B, however, the depth dimension D2 of the second groove part 521B may be made larger than the depth dimension D1 of the first groove part 521A. In this case, to form the opening areas of the respective groove parts 521A, 521B to be equal, the area of the first bottom surface 521A1 of the first groove part 521A may be made larger than the area of the second bottom surface 521B1 of the second groove part 521B. Even in the configuration, there are the above described advantages that high resolution can be realized and reduction of electrostatic attractive force can be prevented, and, in addition, at the bonding step, the workability of the bonding work may be improved.

In the above described respective embodiments, the second electrode 542 is formed on the movable surface 522A, however, the second electrode 542 may be formed in the connection holding part 523.

In the above described respective embodiments, the thickness dimension of the second substrate 52 is set to 200 μm, for example, it may be set to 500 μm, the same dimension as that of the first substrate 51. In this case, in comparison to the case where the thickness dimension is 200 μm, the side etching in the respective groove parts becomes larger for providing the desired thickness dimension of the connection holding part, however, the side etching is smaller than that in the case where the groove part is formed only on one surface of the substrate as in related art. Further, the movable part becomes thicker and the flexure of the movable mirror may be suppressed and the respective mirrors maybe further maintained in parallel.

At the manufacturing process of the second substrate 52 in the above described respective embodiments, the second electrode 542 is formed prior to the movable mirror 57 of the second electrode 542, however, the movable mirror 57 may be formed first.

In the above described respective embodiments, the bonded surfaces 513A, 524A are bonded by the bonding layer 53, however, not limited to that. For example, they may be bonded by the so-called cold activated bonding of activating the bonded surfaces 513A, 524A and superimposing and pressurizing the activated bonded surfaces 513A, 524A without the bonding surface 53 formed, and any bonding method may be used.

In the above described respective embodiments, the colorimetric sensor 3 is exemplified as an optical module of the invention and the colorimetric instrument 1 including the colorimetric sensor 3 is exemplified as a photometric analyzer, however, not limited to those. For example, a gas sensor that allows a gas to enter the sensor and detects light absorbed by the gas of incident light may be used as the optical module of the invention, and a gas detector of analyzing and discriminating the gas flowing into the sensor using the gas sensor may be employed as the photometric analyzer of the invention. Further, the photometric analyzer may be a spectroscopic camera, a spectroscopic analyzer, or the like including the optical module.

Furthermore, by temporally changing intensity of lights having respective wavelengths, data can be transmitted by the lights having the respective wavelengths. In this case, by spectroscopically separating light having a specific wavelength using the etalon 5 provided in the optical module and receiving it by the light receiving unit, the data transmitted by the light having the specific wavelength may be extracted, and, by the photometric analyzer including the optical module for data extraction, the data of the light having the respective wavelengths are processed and optical communications may be performed.

The entire disclosure of Japanese Patent Application No. 2010-227242, filed Oct. 7, 2010 is expressly incorporated by reference herein.

What is claimed is:

1. A tunable interference filter comprising:
a first substrate;
a second substrate facing the first substrate, the second substrate including a movable portion;
a first reflection film formed on the first substrate;
a second reflection film formed on the movable portion of the second substrate, the second reflection film facing the first reflection film by interposing a gap; and
a gap adjustable-part that adjusts the gap,
wherein the second substrate has a first surface and a second surface opposed to the first surface, the second reflection film being formed on the first surface, a first groove is formed on the first surface, and a second groove is formed on the second surface that faces the first groove;
the first groove has a first bottom surface, a first inner side surface, and a first connection surface that is disposed between the first bottom surface and the first inner side surface;
the second groove has a second bottom surface, a second inner side surface, and a second connection surface that is disposed between the second bottom surface and the second inner side surface;
the first bottom surface is located entirely within the second bottom surface in a plan view;
the first connection surface is located inside of the second connection surface in the plan view; and
the second reflection film formed on the movable portion is surrounded by the first and second grooves in the plan view.

2. The tunable interference filter according to claim 1, wherein the first groove has a first bottom surface,
wherein the second groove has a second bottom surface, and
wherein a first area of the first bottom surface is equal to a second area of the second bottom surface.

3. The tunable interference filter according to claim 2, wherein the first groove has a first depth, and
wherein the second groove has a second depth that is equal to the first depth.

4. The tunable interference filter according to claim 1, wherein the first groove has a first edge and a second edge,
wherein the second groove has a third edge and fourth edge,
wherein the first edge overlaps with the third edge in the plan view, and
wherein the second edge overlaps with the fourth edge in the plan view.

5. The tunable interference filter according to claim 4, wherein the first groove has a first depth, and
wherein the second groove has a second depth that is equal to the first depth.

6. The tunable interference filter according to claim 1, wherein the first groove has a first depth, and
wherein the second groove has a second depth that is equal to the first depth.

7. The tunable interference filter according to claim 1, wherein the first groove has a first depth, and
wherein the second groove has a second depth that is equal to the first depth.

8. The tunable interference filter according to claim 1, wherein the first groove has a first depth, and
wherein the second groove has a second depth that is equal to the first depth.

9. The tunable interference filter according to claim 1, wherein a first area of the first bottom surface is smaller than a second area of the second bottom surface,
wherein the first bottom surface is located within a second bottom surface in the plan view,
wherein the first groove has a first edge and a second edge,
wherein the second groove has a third edge and a fourth edge,
wherein the first edge overlaps with the third edge in the plan view, and
wherein the second edge overlaps with the fourth edge in the plan view.

10. The tunable interference filter according to claim 9, wherein the first groove has a first depth, and
wherein the second groove has a second depth that is smaller than the first depth.

11. An optical module comprising:
the tunable interference filter according to claim 1; and
a light receiving unit that receives light transmitted through the tunable interference filter.

12. A photometric analyzer comprising:
the optical module according to claim 11; and
an analytical processing unit that analyzes light properties of the light based on the light received by the light receiving unit of the optical module.

13. The tunable interference filter according to claim 1, wherein the second groove is formed around the second reflection film in a plan view.

14. The tunable interference filter according to claim 1, wherein the first groove has a first ring shape in a plan view, and
wherein the second groove has a second ring shape in the plan view.

15. The tunable interference filter according to claim 1, wherein the second substrate includes a support portion and a holding portion, with the holding portion being defined by a portion of the second substrate in a thickness direction between the first and second grooves, and a width of the movable portion in a direction orthogonal to the thickness direction is less between the second inner side surface of the second groove than a width of the movable portion in the direction orthogonal to the thickness direction between the first inner side surface of the first groove.

16. The tunable interference filter according to claim 1, wherein a width of the first bottom surface of the first groove is less than a width of the second bottom surface such that the first bottom surface is located entirely within the second bottom surface in the plan view.

17. A tunable interference filter comprising:
a first substrate;
a second substrate facing the first substrate, the second substrate including a movable portion;
a first reflection film formed on the first substrate;

a second reflection film formed on the movable portion of the second substrate, the second reflection film facing the first reflection film by interposing a gap; and a gap adjustable-part that adjusts the gap, wherein the second substrate has a first surface and a second surface opposed to the first surface, the second reflection film being formed on the first surface, a first groove is formed on the first surface, and a second groove is formed on the second surface that faces the first groove;

the first groove has a first bottom surface, a first inner side surface, and first connection surface that is disposed between the first bottom surface and the first inner side surface;

the second groove has a second bottom surface, a second inner side surface, and a second connection surface that is disposed between the second bottom surface and the second inner side surface;

the first bottom surface is located entirely within the second bottom surface in a plan view;

the first connection surface is located inside of the second connection surface in the plan view;

the second reflection film formed on the movable portion is surrounded by the first and second grooves in the plan view; and the first and second bottom surfaces of the first and second grooves, respectively, are the same shape in the plan view.

18. The tunable interference filter according to claim 17, wherein the second substrate includes a support portion and a holding portion, with the holding portion being defined by a portion of the second substrate in a thickness direction between the first and second grooves, and a width of the movable portion in a direction orthogonal to the thickness direction is less between the second inner side surface of the second groove than a width of the movable portion in the direction orthogonal to the thickness direction between the first inner side surface of the first groove.

19. The tunable interference filter according to claim 17, wherein a width of the first bottom surface of the first groove is less than a width of the second bottom surface such that the first bottom surface is located entirely within the second bottom surface in the plan view.

* * * * *